United States Patent
Mizutani

(10) Patent No.: US 10,210,622 B2
(45) Date of Patent: Feb. 19, 2019

(54) IMAGE PROCESSING DEVICE, IMAGE PROCESSING METHOD, AND RECORDING MEDIUM STORING PROGRAM

(71) Applicant: Shigeo Mizutani, Kanagawa (JP)

(72) Inventor: Shigeo Mizutani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/497,321

(22) Filed: Apr. 26, 2017

(65) Prior Publication Data

US 2017/0330337 A1    Nov. 16, 2017

(30) Foreign Application Priority Data

May 16, 2016    (JP) .................................. 2016-098236

(51) Int. Cl.
    *G06T 7/33*    (2017.01)
    *G06T 3/40*    (2006.01)
    *G06T 5/00*    (2006.01)

(52) U.S. Cl.
    CPC ............ *G06T 7/337* (2017.01); *G06T 3/4038* (2013.01); *G06T 5/006* (2013.01)

(58) Field of Classification Search
    CPC ......... G06T 3/4038; G06T 5/006; G06T 5/50; G06T 7/337; G06T 2207/10024; G06T 3/0062; G06T 3/60; G06T 2207/10016; G06K 9/03; G06K 9/4609; G06K 9/6202; G06K 9/6215; H04N 1/387; H04N 1/3872; H04N 5/23238
    USPC ............................. 382/232; 348/231.1, 222.1
    See application file for complete search history.

(56) References Cited

U.S. PATENT DOCUMENTS

| | | | | |
|---|---|---|---|---|
| 6,157,747 A * | 12/2000 | Szeliski | ................. | G06K 9/209 345/419 |
| 6,249,616 B1 * | 6/2001 | Hashimoto | ............... | G06T 7/35 345/427 |
| 6,389,179 B1 * | 5/2002 | Katayama | ............. | G06T 3/4038 348/36 |
| 6,424,752 B1 * | 7/2002 | Katayama | ............. | G06T 3/0081 345/629 |

(Continued)

FOREIGN PATENT DOCUMENTS

| | | |
|---|---|---|
| JP | 2015-046044 | 3/2015 |
| WO | WO2012/120561 A1 | 9/2012 |

*Primary Examiner* — Mekonen Bekele
(74) *Attorney, Agent, or Firm* — Oblon, McClelland, Maier & Neustadt, L.L.P.

(57) ABSTRACT

An image processing device, a method for processing an image, and a recording medium storing a program for causing a computer to execute the method. The image processing device and the method includes converting captured images in which image capturing ranges partially overlap into images in a coordinate system different from a coordinate system, based on a first conversion data, detecting an amount of misalignment in an overlapping area, calculating correction amounts for the first conversion data related to generation of the second conversion image for each coordinate value of the second conversion image, based on the detected amount of misalignment, detecting a subject area in which a subject exists from the second conversion image, and correcting the first conversion data related to generation of the second conversion image, using one of the calculated correction amounts of a subject area in which a dynamic subject exists.

8 Claims, 21 Drawing Sheets

(56) References Cited

U.S. PATENT DOCUMENTS

| | | | | |
|---|---|---|---|---|
| 6,473,536 B1* | 10/2002 | Chiba | .................... | G06T 11/00 |
| | | | | 345/630 |
| 6,677,982 B1* | 1/2004 | Chen | .................... | G06T 3/4038 |
| | | | | 348/36 |
| 7,194,112 B2* | 3/2007 | Chen | .................... | G06T 3/4038 |
| | | | | 348/42 |
| 9,400,939 B2* | 7/2016 | Lin | .................... | G06K 9/4671 |
| 9,917,972 B2* | 3/2018 | Mizutani | .............. | H04N 1/2112 |
| 10,063,774 B2* | 8/2018 | Takenaka | ............... | H04N 1/387 |
| 2002/0163530 A1* | 11/2002 | Takakura | .............. | G06T 3/4038 |
| | | | | 345/629 |
| 2011/0069762 A1* | 3/2011 | Yoshino | ................ | G06T 7/0026 |
| | | | | 375/240.16 |
| 2015/0229876 A1* | 8/2015 | Mizutani | .............. | H04N 1/2112 |
| | | | | 348/231.1 |
| 2015/0294490 A1* | 10/2015 | Lin | .......................... | G06T 7/40 |
| | | | | 382/195 |
| 2016/0050369 A1 | 2/2016 | Takenaka et al. | | |
| 2016/0212336 A1 | 7/2016 | Takenaka et al. | | |

\* cited by examiner

| COORDINATE VALUES OF POST-CONVERSION IMAGE | | COORDINATE VALUES OF PRE-CONVERSION PARTIAL-VIEW IMAGE | |
|---|---|---|---|
| θ (pix) | φ (pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

FIG. 11

| COORDINATE VALUES OF POST-CONVERSION IMAGE | | AMOUNT OF CORRECTION | |
|---|---|---|---|
| $\theta$ (pix) | $\phi$ (pix) | $\Delta\theta$ (pix) | $\Delta\phi$ (pix) |
| 0 | 0 | | |
| 1 | 0 | | |
| ⋮ | ⋮ | ⋮ | ⋮ |
| 3598 | 1799 | | |
| 3599 | 1799 | | |

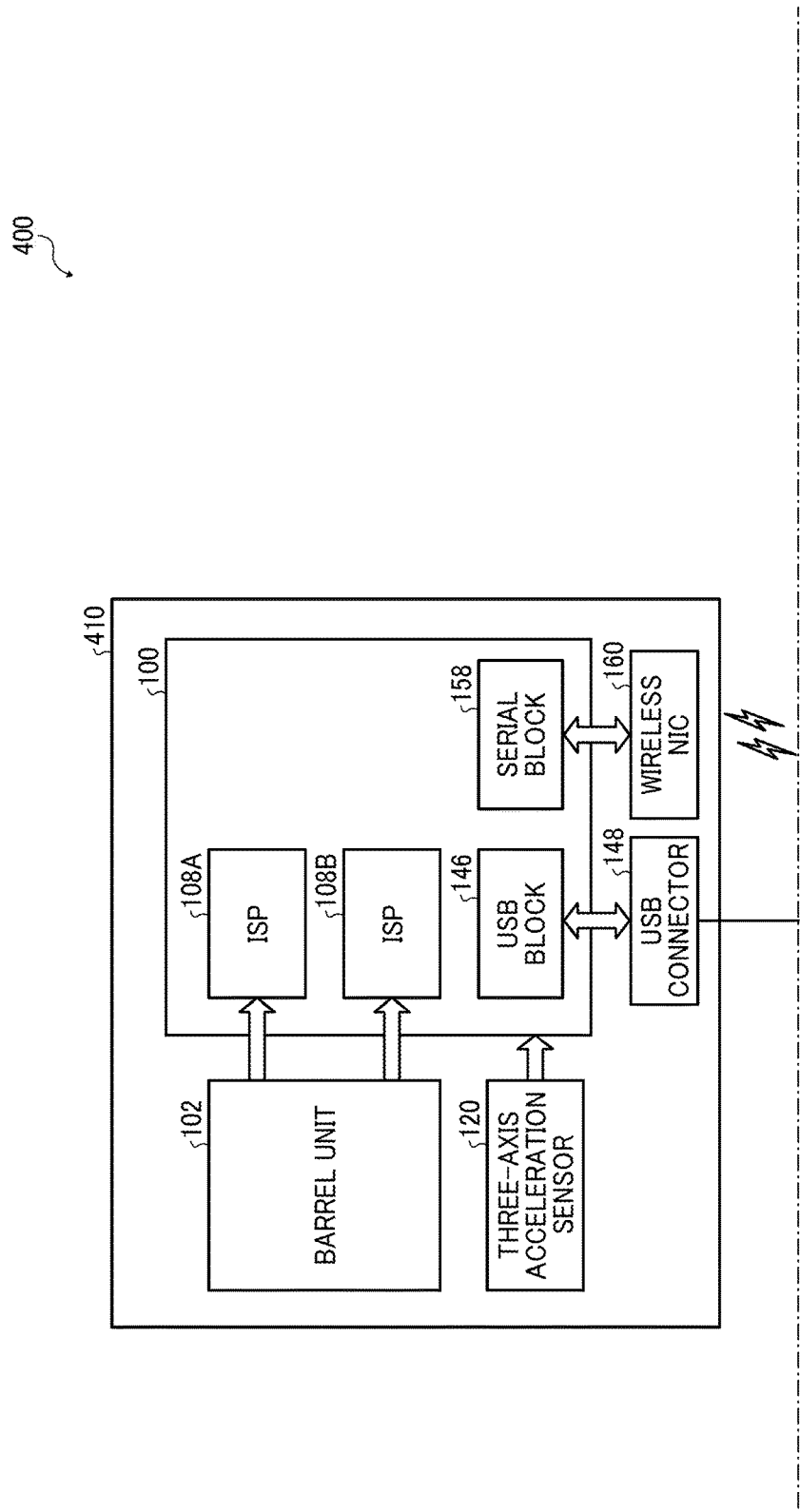

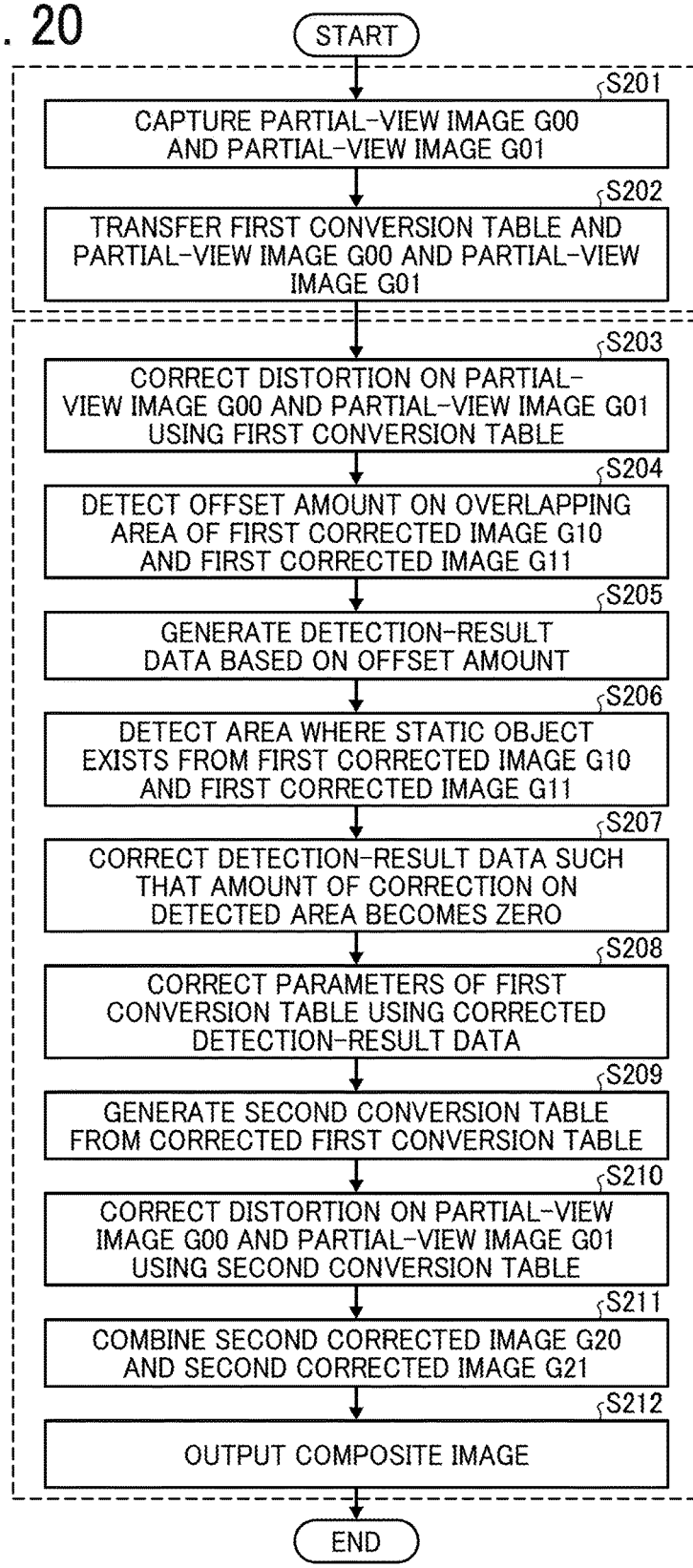

IMAGE PROCESSING DEVICE, IMAGE PROCESSING METHOD, AND RECORDING MEDIUM STORING PROGRAM

CROSS-REFERENCE TO RELATED APPLICATIONS

This patent application is based on and claims priority pursuant to 35 U.S.C. § 119(a) to Japanese Patent Application No. 2016-098236, filed on May 16, 2016, in the Japan Patent Office, the entire disclosure of which is hereby incorporated by reference herein.

BACKGROUND

Technical Field

Embodiments of the present disclosure described herein provide an image processing device, an image processing method, a recording medium storing a program for causing a computer to execute the image processing method.

Description of the Related Art

Conventionally, an imaging systems that uses a plurality of wide-angle lenses such as fish-eye lenses and super wide-angle lenses to capture an omnidirectional image at a time is known (hereinafter, such an omnidirectional image is referred to as a spherical image). Such an imaging system projects images from multiple lenses onto a sensor plane, and combines the obtained images together by image processing. Accordingly, a spherical image is generated. For example, two wide-angle lenses that have angles of view of 180 degrees or wider may be used to generate a spherical image.

In the image processing as above, distortion correction and projective transformation are performed on the partial images captured by lens optical systems, based on a predetermined projection model and in view of the distortion with reference to an optimal model. Then, the partial images are combined based on the overlapping portions included in the partial images, and a sheet of composite image (spherical image) is generated. In the combining processing of the images as above, the amount of misalignment of a subject in common is detected in the overlapping areas of the converted partial images using, for example, pattern matching, and the combining position of the partial images is corrected (adjusted) on the basis of the amount of misalignment.

SUMMARY

An image processing device, a method for processing an image, and a computer-readable non-transitory recording medium storing a program for causing a computer to execute the method. The image processing device and the method includes converting a plurality of captured images in which image capturing ranges partially overlap into images in a coordinate system different from a coordinate system for the captured image, based on a first conversion data, detecting an amount of misalignment in an overlapping area in which the image capturing ranges overlap, between a first conversion image being a reference image and a second conversion image being a comparison image, of a plurality of conversion images generated by the conversion, calculating correction amounts for the first conversion data related to generation of the second conversion image for each coordinate value of the second conversion image, based on the detected amount of misalignment, detecting a subject area in which a subject exists from the second conversion image, correcting the first conversion data related to generation of the second conversion image, using one of the calculated correction amounts of a subject area in which a dynamic subject exists, and performing rotational coordinate transformation on the corrected first conversion data, to generate second conversion data for image combination defining conversion of the plurality of captured images.

BRIEF DESCRIPTION OF THE SEVERAL VIEWS OF THE DRAWINGS

A more complete appreciation of exemplary embodiments and the many attendant advantages thereof will be readily obtained as the same becomes better understood by reference to the following detailed description when considered in connection with the accompanying drawings.

FIG. 11 is a schematic diagram of the data structure of first detection-result data generated by a detection-result generator, according to an embodiment of the present disclosure.

FIG. 19A and FIG. 19B are a schematic diagram illustrating an imaging system according to an alternative embodiment of the present disclosure.

FIG. 20 is a flowchart illustrating image-combining processes executed by an imaging system according to an alternative embodiment of the present disclosure.

Figure 1:
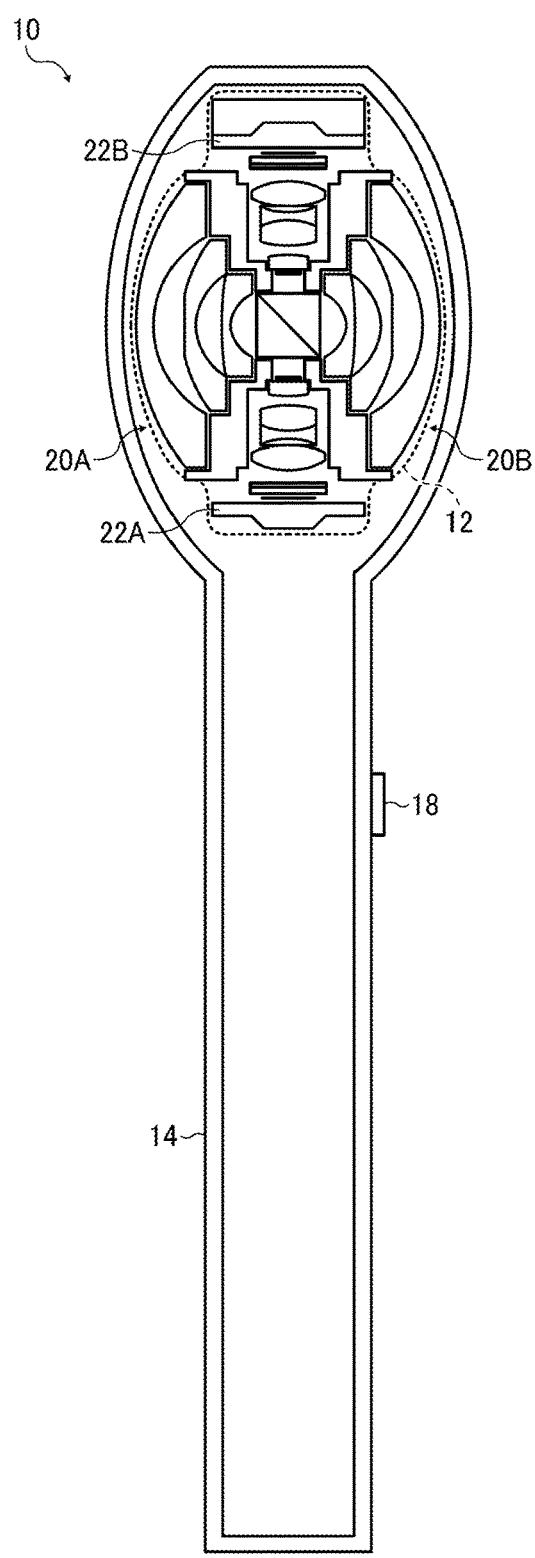
FIG. 1 is a diagram illustrating a configuration of an imaging system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, an embodiment of the present disclosure will be described with reference to the drawings. In the following embodiment, an imaging system will be described including an image capturing body in which two fisheye lenses are included in its optical system. Incidentally, the present disclosure is not limited to the embodiment.

[General Arrangement]

Hereinafter, a configuration of an imaging system according to the embodiment will be described.

FIG. 1 is a diagram (sectional view) illustrating a configuration of an imaging system according to the present embodiment.

The imaging system 10 includes an image capturing body 12, a housing 14, and a shutter button 18. The image capturing body 12 includes lens optical systems 20A and 20B, solid-state image capturing devices 22A and 22B. The housing 14 accommodates components related to the imaging system 10.

The lens optical systems 20A and 20B are each a lens, for example, a fisheye lens, or a wide-angle lens. The lens optical systems 20A and 20B each have an angle of view equal to or greater than 180 degrees, for example. The lens optical systems 20A and 20B may be each an optical system configured by a plurality of lenses, for example, a fisheye lens of seven elements in six groups. The lens optical systems 20A and 20B may each include an optical element other than the lens, such as a prism, a filter, or an aperture.

The solid-state image capturing devices 22A and 22B are each an image capturing device including an optical sensor such as a charge coupled device (CCD), or a complementary metal oxide semiconductor (CMOS). The solid-state image capturing devices 22A and 22B each start image capturing (shooting) of a still image or a moving image in accordance with depression of the shutter button 18.

The lens optical system 20A has a positional relationship determined with respect to the solid-state image capturing device 22A. The positional relationship is determined so that the optical axis of the lens optical system 20A is orthogonal to the center of the light receiving area of the solid-state image capturing device 22A, and the light receiving area is the image plane. Similarly, the lens optical system 20B has a positional relationship determined with respect to the solid-state image capturing device 22B. The solid-state image capturing devices 22A and 22B convert light collected via the lens optical systems 20A and 20B into image signals, respectively.

Incidentally, the imaging system 10 may include a controller and a battery within the housing 14.

In the configuration illustrated in FIG. 1, the lens optical systems 20A and 20B are installed so as to have the same optical axis and face opposite directions to each other. The solid-state image capturing devices 22A and 22B each generate an image signal from the collected light and output the signal. Each image based on the image signal generates an image with a solid angle of $4n$ radians (hereinafter, referred to as a spherical image). The spherical image is an image in which all directions are shot that can be seen from the shooting point. Incidentally, the spherical image may be a so-called panoramic image in which 360 degrees are shot only on the horizontal plane.

When the angle of view of each of the lens optical systems 20A and 20B exceeds 180 degrees, images based on respective image signals generated by the solid-state image capturing devices 22A and 22B include the same subject. When the images based on the respective image signals are combined, the subject shot in each image become a reference.

The generated spherical image is output to an output apparatus such as an image forming apparatus or a display coupled to the imaging system 10. The generated spherical image may be output to a recording medium such as an SD (registered trademark) card, or a USB memory.

[Hardware Configuration]

Figure 2A:
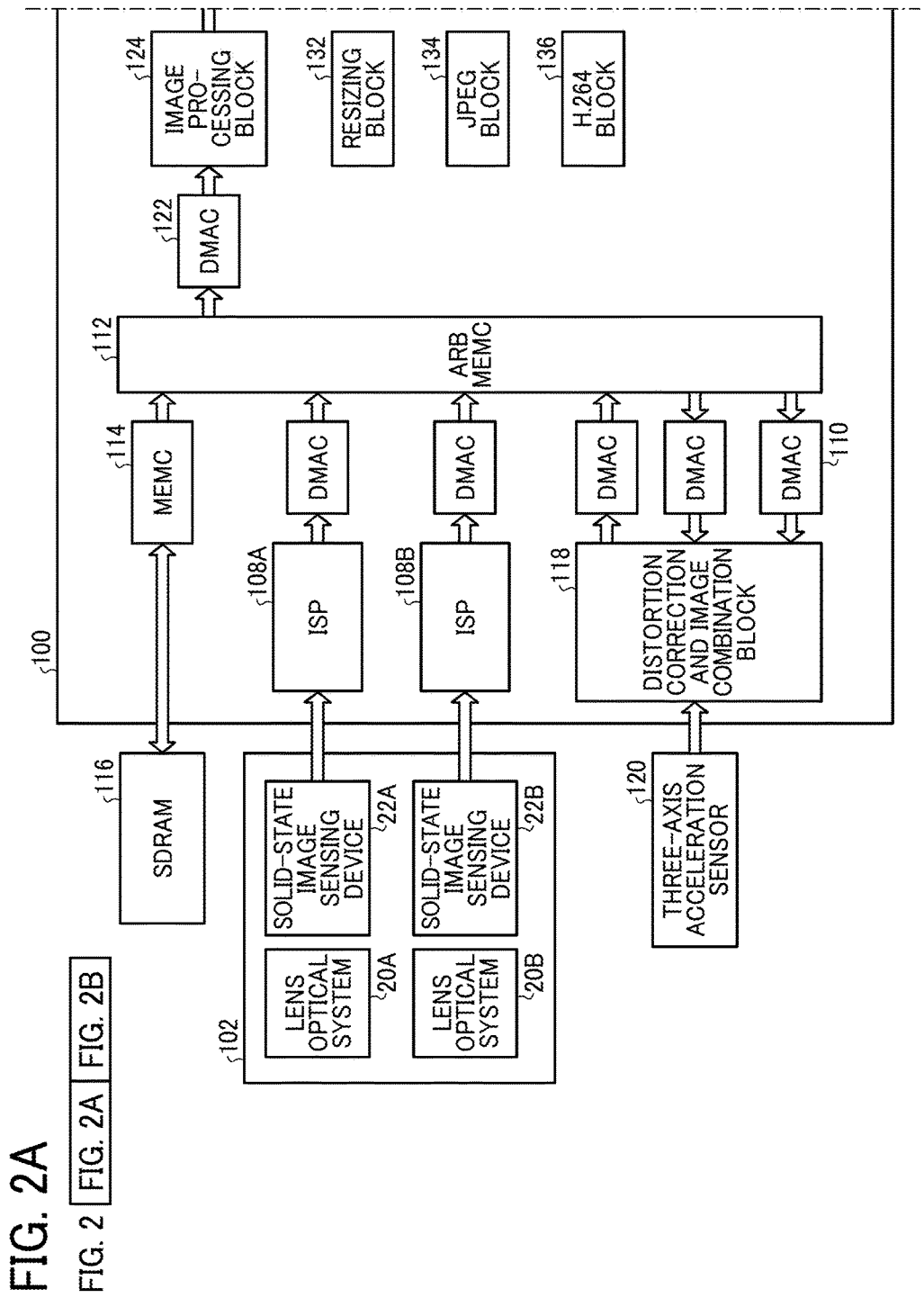
FIG. 2A and FIG. 2B are a diagram illustrating of a hardware configuration of an imaging system according to an embodiment of the present disclosure.
Figure 2B:
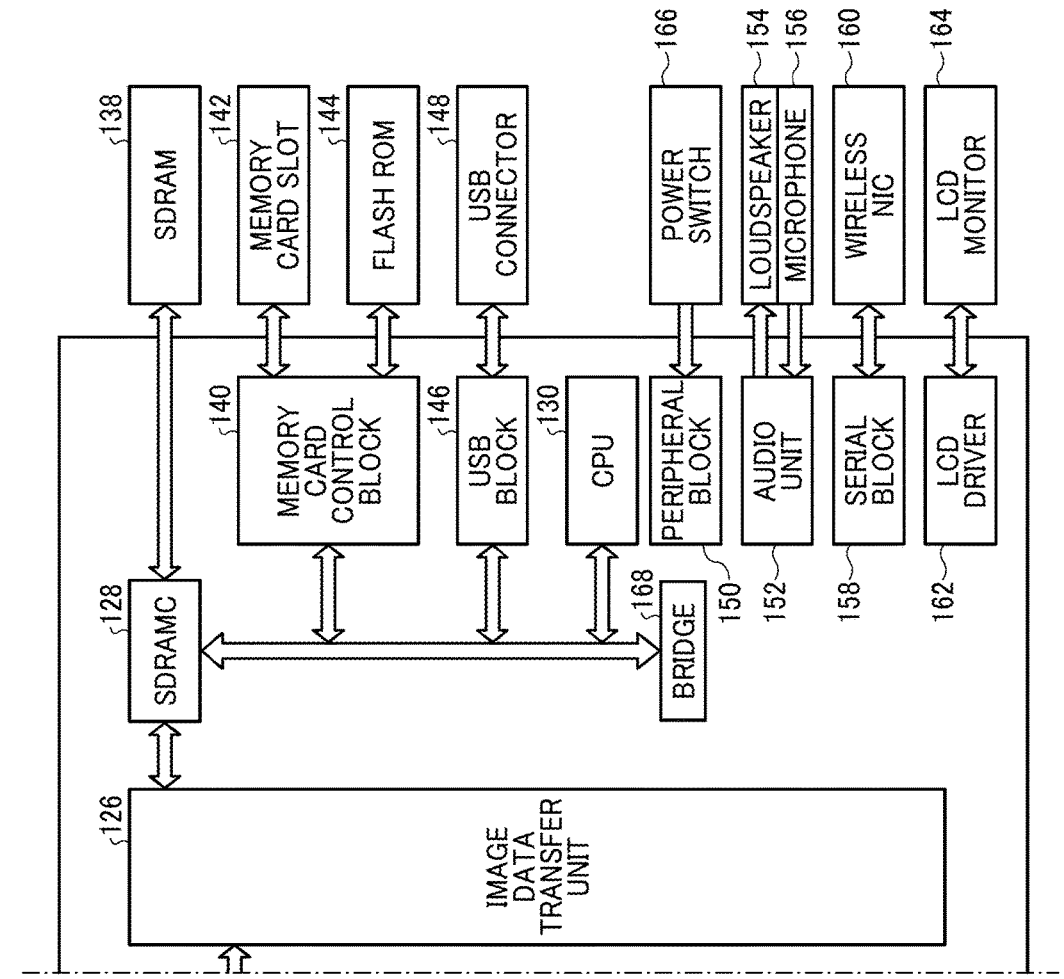

FIG. 2A and FIG. 2B illustrate a hardware configuration of the imaging system 10 according to the present embodiment.

The imaging system 10 includes a digital still camera processor (hereinafter, simply referred to as a processor) 100, a lens barrel unit 102, and various components coupled to the processor 100. The lens barrel unit 102 includes the above-described two sets of the lens optical systems 20A and 20B, and solid-state image capturing devices 22A and 22B. The solid-state image capturing devices 22A and 22B are controlled by a control command from a CPU 130 described later within the processor 100.

The processor 100 includes image signal processors (ISPs) 108A and 108B, a direct memory access controller (DMAC) 110, an arbiter for arbitration of memory access (ARBMEMC) 112, a memory controller for controlling memory access (MEMC) 114, and a distortion correction image combination block 118. The ISPs 108A and 108B perform white balance setting and gamma setting to image data input through signal processing by the respective solid-state image capturing devices 22A and 22B. The MEMC 114 is coupled to an SDRAM 116. The SDRAM 116 temporarily stores data when processing is performed in the ISPs 108A and 108B and distortion correction image combination block 118. The distortion correction image combination block 118 uses information from three-axis acceleration sensor 120 to perform distortion correction and top-and-bottom correction to two partial images obtained from two image capturing optical systems, and combines the images.

The processor 100 further includes a DMAC 122, an image processing block 124, the CPU 130, an image data transfer unit 126, an SDRAMC 128, a memory card control block 140, a USB block 146, a peripheral block 150, an audio unit 152, a serial block 158, a liquid crystal display (LCD) driver 162, and a bridge 168.

The CPU 130 controls operation of each part of the imaging system 10. The image processing block 124 uses a resize block 132, a JPEG block 134, and an H.264 block 136 to perform various types of image processing to the image data. The resize block 132 is a block for enlarging or reducing the size of the image data by interpolation processing. The JPEG block 134 is a codec block for performing JPEG compression and decompression. The H.264 block 136 is a codec block for performing moving image compression and decompression, such as H.264. The image data transfer unit 126 transfers the image subjected to image processing in the image processing block 124. The SDRAMC 128 controls an SDRAM 138 coupled to the processor 100, and the SDRAM 138 temporarily stores the image data when the image data is subjected to various types of processing in the processor 100.

The memory card control block 140 controls read and write to a flash ROM 144 and a memory card inserted into a memory card slot 142. The memory card slot 142 is a slot for detachably attaching the memory card to the imaging system 10. The USB block 146 controls USB communication with an external device such as a personal computer coupled via a USB connector 148. The peripheral block 150 is coupled to a power switch 166. The audio unit 152 is coupled to a microphone 156 by which a user inputs an audio signal, and a speaker 154 for outputting a recorded audio signal, and controls audio input and output. The serial block 158 controls serial communication with the external device such as the personal computer, and is coupled to a wireless network interface card (NIC) 160. The LCD driver 162 is a drive circuit for driving an LCD monitor 164, and performs conversion of a signal for displaying various states on the LCD monitor 164.

The flash ROM 144 stores a control program written in a code that can be decoded by the CPU 130, and various parameters. When the power switch 166 is operated and power is turned on, the control program is loaded to a main memory. The CPU 130 controls operation of each part of the apparatus in accordance with the program read into the main memory, and temporarily stores necessary data for control in the SDRAM 138 and a local SRAM.

Figure 3:
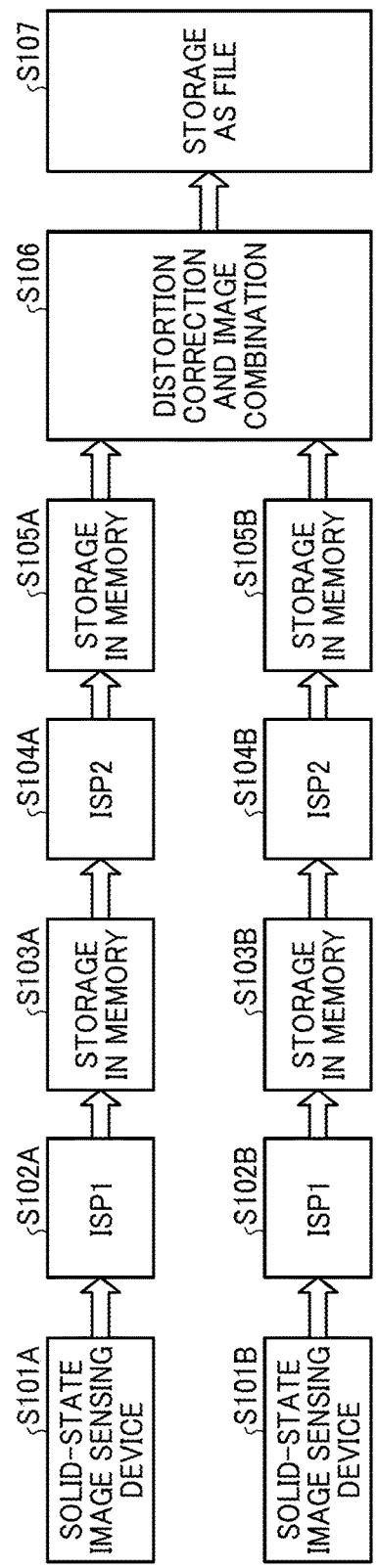
FIG. 3 is a diagram illustrating a flow of an entire image processing in an imaging system according to an embodiment of the present disclosure.

FIG. 3 is a diagram illustrating an entire image processing flow in the imaging system 10.

First, in steps S101A and 101B, the solid-state image capturing devices 22A and 22B capture images, respectively. In steps S102A and 102B, to Bayer RAW images output from the respective solid-state image capturing devices 22A and 22B, the ISPs 108A and 108B illustrated in FIG. 2A and FIG. 2B perform optical black correction processing, defective pixel correction processing, linear correction processing, shading processing, and area division average processing. In steps S103A and 103B, the images are stored in memories. In steps S104A and 104B, ISPs 108A and 108B illustrated in FIG. 2A and FIG. 2B further perform white balance processing, gamma correction processing, Bayer interpolation processing, YUV conversion processing, edge enhancement processing, and color correction processing, and, in steps S105A and 105B, the images are stored in memories.

When the above-described processing is completed for the two solid-state image capturing devices 22A and 22B, in step S106, distortion correction and image-combining processes are performed to partial images subjected to the above processing. In step S107, tagged if appropriate, a spherical image is stored as a file in an incorporated memory or an external storage. In a process of the above distortion correction and image-combining processes, if appropriate, information from the three-axis acceleration sensor 120 may be obtained, and tilt and top-and-bottom correction may be performed. In addition, the stored image file may be subjected to compression processing if appropriate.

[Functional Configuration]

Hereinafter, an image combination function included in the imaging system 10 will be described.

Figure 4:
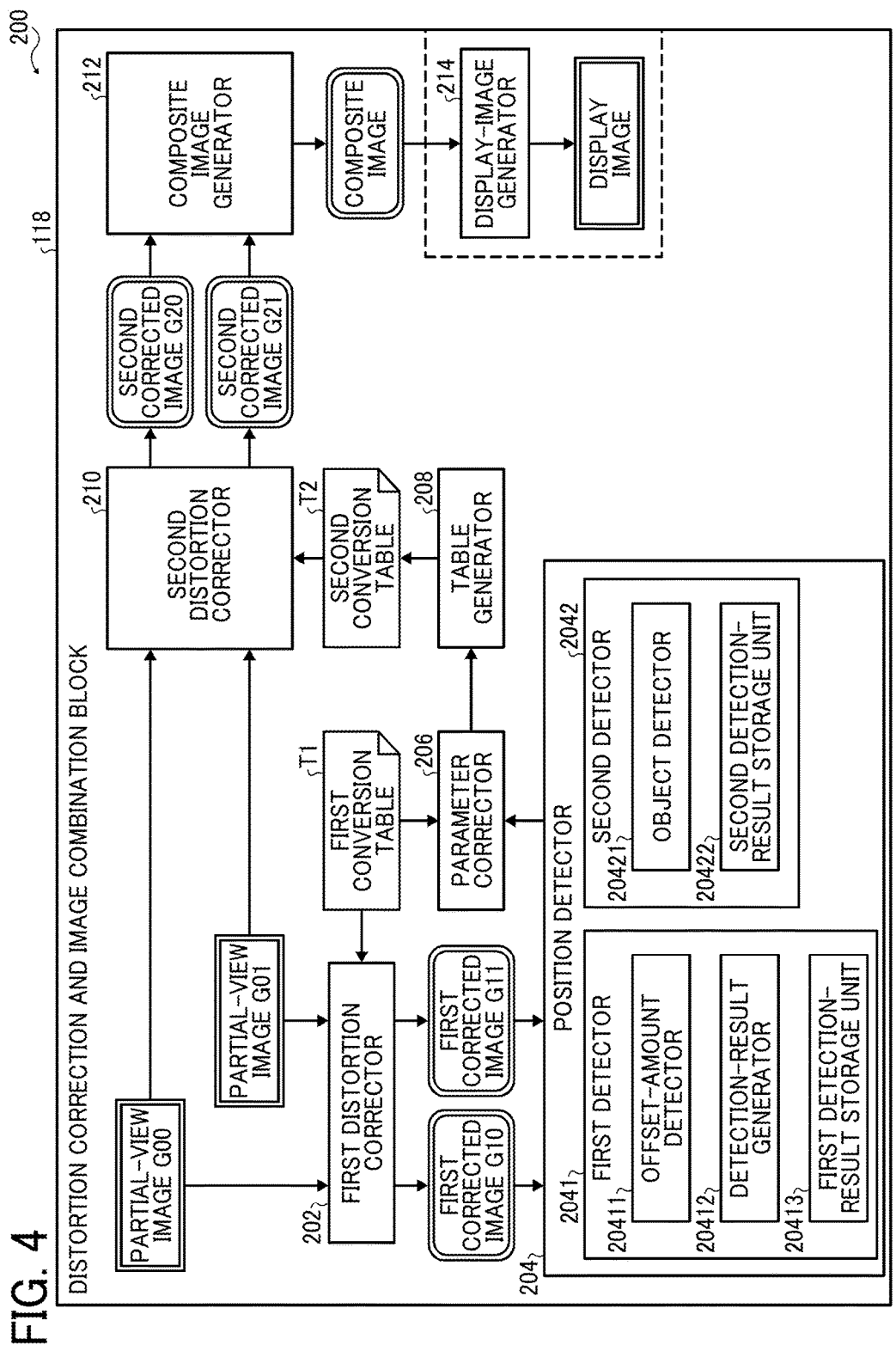
FIG. 4 is a diagram illustrating a functional block of an image-combining function provided for an imaging system according to an embodiment of the present disclosure.

FIG. 4 is a diagram illustrating a functional block 200 of the image combination function realized in the imaging system 10.

As illustrated in FIG. 4, the distortion correction image combination block 118 includes a first distortion corrector 202, a position detector 204, a parameter corrector 206, a table generator 208, a second distortion corrector 210, and an image combiner 212. Some or all of these functional units may each have a software configuration realized by cooperation between the processor and the program. In addition, some or all of these functional units may each have a hardware configuration realized by one or more processing circuits designed to realize each function (for example, an application specific integrated circuit (ASIC) and a system on a chip (SoC)).

The distortion correction image combination block 118 inputs two captured images from the two solid-state image capturing devices 22A and 22B through image processing by the ISPs 108A and 108B. Here, numbers "0" and "1" are given to the solid-state image capturing devices 22A and 22B, respectively. In addition, a captured image whose source is the solid-state image capturing device 22A is written as a "partial image G00," and a captured image whose source is the solid-state image capturing device 22B is written as a "partial image G01." Further, the distortion correction image combination block 118 is provided with a first conversion table T1 (first conversion data) for position detection, the table T1 being created in advance in a manufacturer or the like in accordance with a predetermined projection model on the basis of design data of the respective lens optical systems.

The first distortion corrector 202 uses the first transformation table T1 to perform distortion correction to the partial image G00 and partial image G01 input, and respectively generates a first correction image G10 and a first correction image G11 for position detection. The partial image G00 and partial image G01 input are each captured by a two-dimensional solid-state image capturing device whose light receiving area has an area, and are image data expressed in a plane coordinate system (x, y). The first correction image G10 and first correction image G11 subjected to distortion correction using the first conversion table T1 are image data in a coordinate system different from that for original partial images. More specifically, the first correction image G10 and first correction image G11 are image data in a spherical image format expressed in a spherical coordinate system (a polar coordinate system having a radius vector of 1 and two angles of deviation θ and φ). Incidentally, in the present embodiment, it is assumed that the first correction image G10 is a reference image and the first correction image G11 is a comparison image.

Figure 5A:
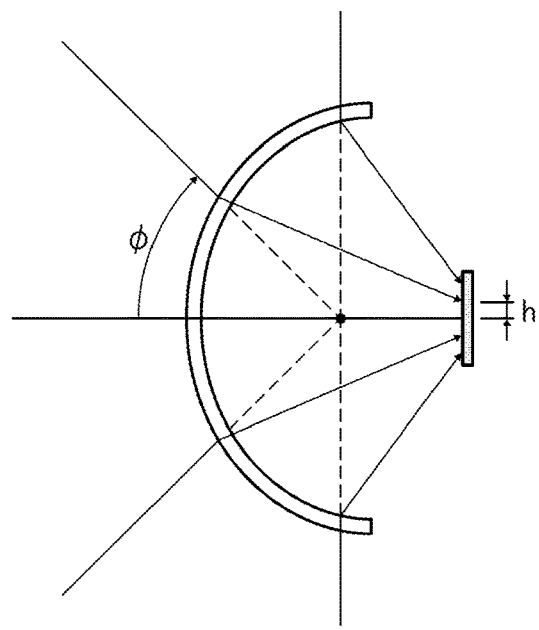
FIG. 5A and FIG. 5B are diagrams illustrating a projection relation in an imaging system where a fish-eye lens is used, according to an embodiment of the present disclosure.
Figure 5B:
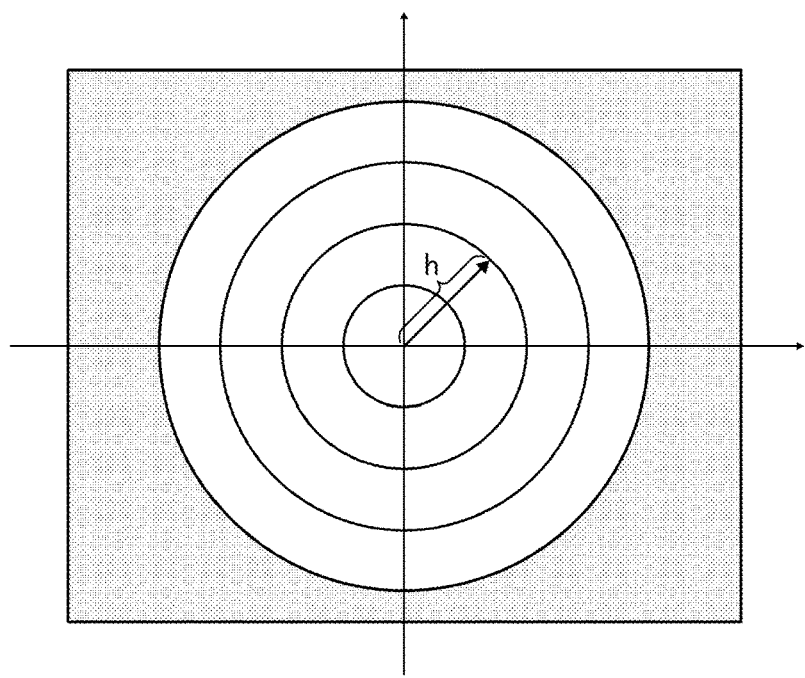

FIGS. 5A and 5B are diagrams illustrating a projection relationship in an imaging system using a fisheye lens.

In the present embodiment, the image shot by the fisheye lens is an image in which directions for approximately a hemisphere from the shooting point are shot. In addition, the fisheye lens generates an image with an image height h that corresponds to an incidence angle φ with respect to the optical axis as illustrated in FIGS. 5A and 5B. A relationship between the image height h and the incidence angle φ is determined by a projection function according to the predetermined projection model. The projection function varies depending on a characteristic of the fisheye lens, and, in a fisheye lens of a projection model called an equidistant projection method, is expressed by h=f×φ, where f is a focal length.

Besides the above, the projection model includes a central projection method (h=f×tan φ), a stereographic projection method (h=2f×tan(φ/2)), an equisolid angle projection method (h=2f×sin(φ/2)), and an orthogonal projection method (h=f×sin φ)). In any method, the image height h of image formation is determined that corresponds to the incidence angle φ and the focal length f from the optical axis. In addition, in the present embodiment, a so-called circular fisheye lens configuration is adopted in which the image circle diameter is smaller than the image diagonal, and the obtained partial image is a planar image including the entire image circle in which approximately the hemisphere of the shooting range is projected, as illustrated in FIG. 5B.

Figure 6A:
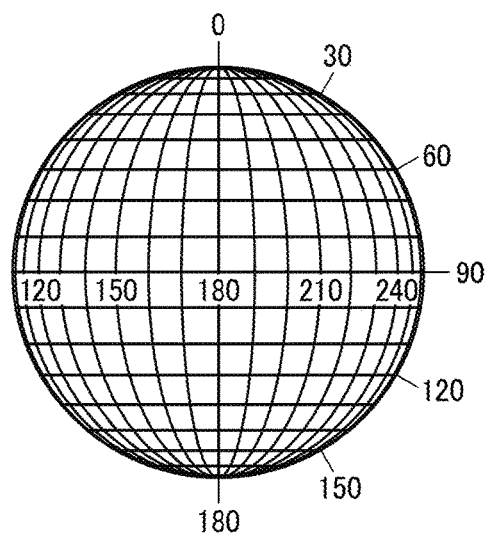
FIG. 6A and FIG. 6B are diagrams illustrating the data structure of image data in an omnidirectional image format, according to an embodiment of the present disclosure.
Figure 6B:
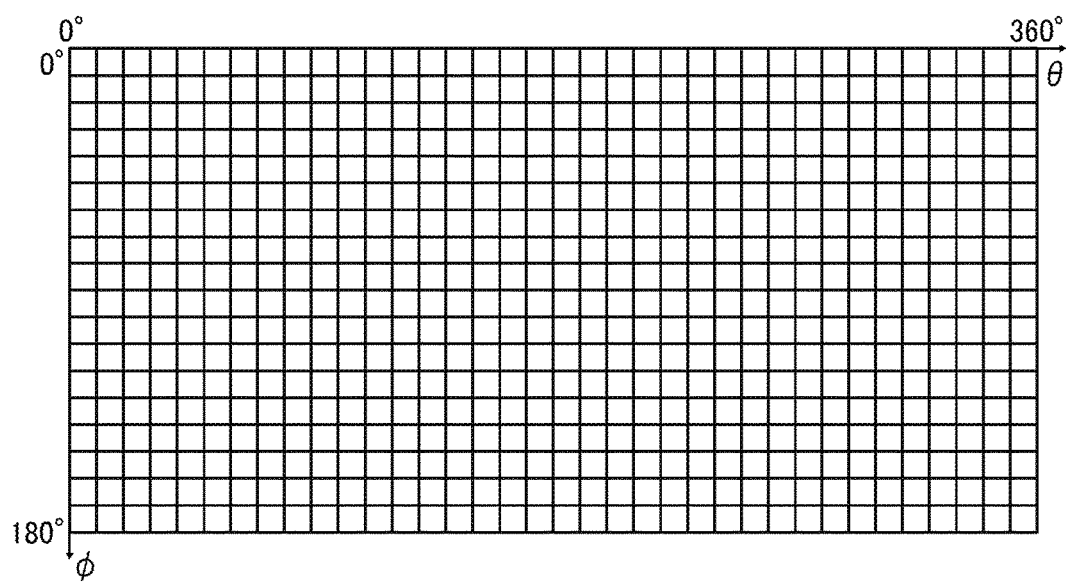

FIGS. 6A and 6B are diagrams illustrating a data structure of image data in a spherical image format used in the present embodiment.

As illustrated in FIGS. 6A and 6B, the image data in the spherical image format is expressed as an array of pixel values whose coordinates are a vertical angle φ that corresponds to an angle with respect to a predetermined axis and a horizontal angle θ that corresponds to a rotation angle around the axis. The horizontal angle θ is in a range from 0 degrees to 360 degrees (also can be expressed as an angle from −180 degrees to +180 degrees), and the vertical angle φ is in a grange from 0 degrees to 180 degrees (similarly, also can be expressed as an angle from −90 degrees to +90 degrees). The coordinate values (θ, φ) are associated with points on the spherical surface expressing all directions around the shooting point, and all directions are mapped onto the spherical image. The plane coordinates of the image shot by the fisheye lens and the coordinates on the spherical surface in the spherical image format can be associated with each other by using the projection function as described in FIGS. 5A and 5B.

Figures 7A, 7B:
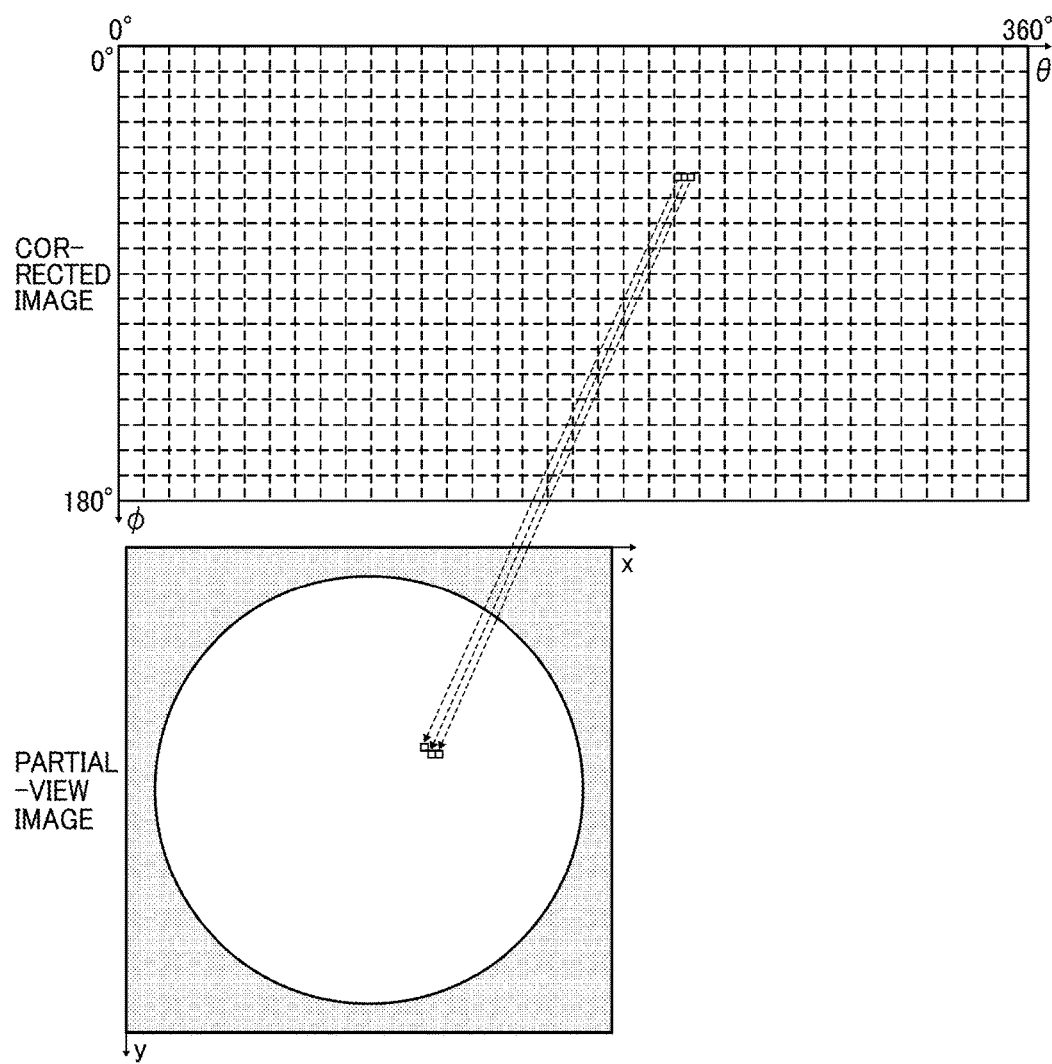
FIG. 7A and FIG. 7B are diagrams illustrating conversion data that a first distortion corrector and a second distortion corrector refer to, according to an embodiment of the present disclosure.

FIGS. 7A and 7B are diagrams illustrating conversion data to which the first distortion corrector 202 and the second distortion corrector 210 refer.

The first conversion table T1 and a second conversion table T2 define projection from the partial image expressed in the plane coordinate system onto the image expressed in the spherical coordinate system. The first conversion table T1 and the second conversion table T2, as illustrated in FIGS. 7A and 7B, for each fisheye lens, hold the information associating coordinate values (θ, φ) of an image after conversion and coordinate values (x, y) of the partial image before conversion to be mapped onto the coordinate value (θ, φ) with each other, for all coordinate values (θ, φ) (θ=0, . . . , 360 degrees, φ=0, . . . , 180 degrees). In the example of FIGS. 7A and 7B, the angle represented by one pixel is 1/10 degrees in both the φ direction and the θ direction, and the first conversion table T1 and the second conversion table T2 have information indicating correspondence relationships of 3600×1800, for each fisheye lens.

The first conversion table T1 is calculated and tabulated, in a manufacturer or the like in advance, after the distortion from an ideal lens model caused by radial distortion and eccentric distortion is corrected on the basis of the projection relationship of the lens described in FIGS. 5A and 5B, based on lens design data. The second conversion table T2 is generated from the first conversion table T1 by predetermined conversion processing, and details will be described later. Incidentally, in the described embodiment, the conversion data is data in which the correspondence relationship of the coordinate values are tabulated. However, in another embodiment, the conversion data may be coefficient data of one or more functions defining projection from a partial image (x, y) expressed in a plane coordinate system onto an image (θ, φ) expressed in a spherical coordinate system.

As illustrated in FIG. 4, the first distortion corrector 202 is a functional unit that corresponds to a first data converter. The first distortion corrector 202 refers to the first conversion table T1 to convert the partial image G00 and the partial image G01, and generates the first correction image G10 (first conversion image) and the first correction image G11 (second conversion image). Specifically, the first distortion corrector 202 refers to the first conversion table T1 for all coordinate values (θ, φ) of the correction image after conversion to obtain the coordinate values (x, y) of the partial image before conversion to be mapped onto the respective coordinate values (θ, φ), and refers to the pixel values in the partial image of the coordinate values (x, y). Thus, the first correction images G10 and G11 are generated.

Figure 8:
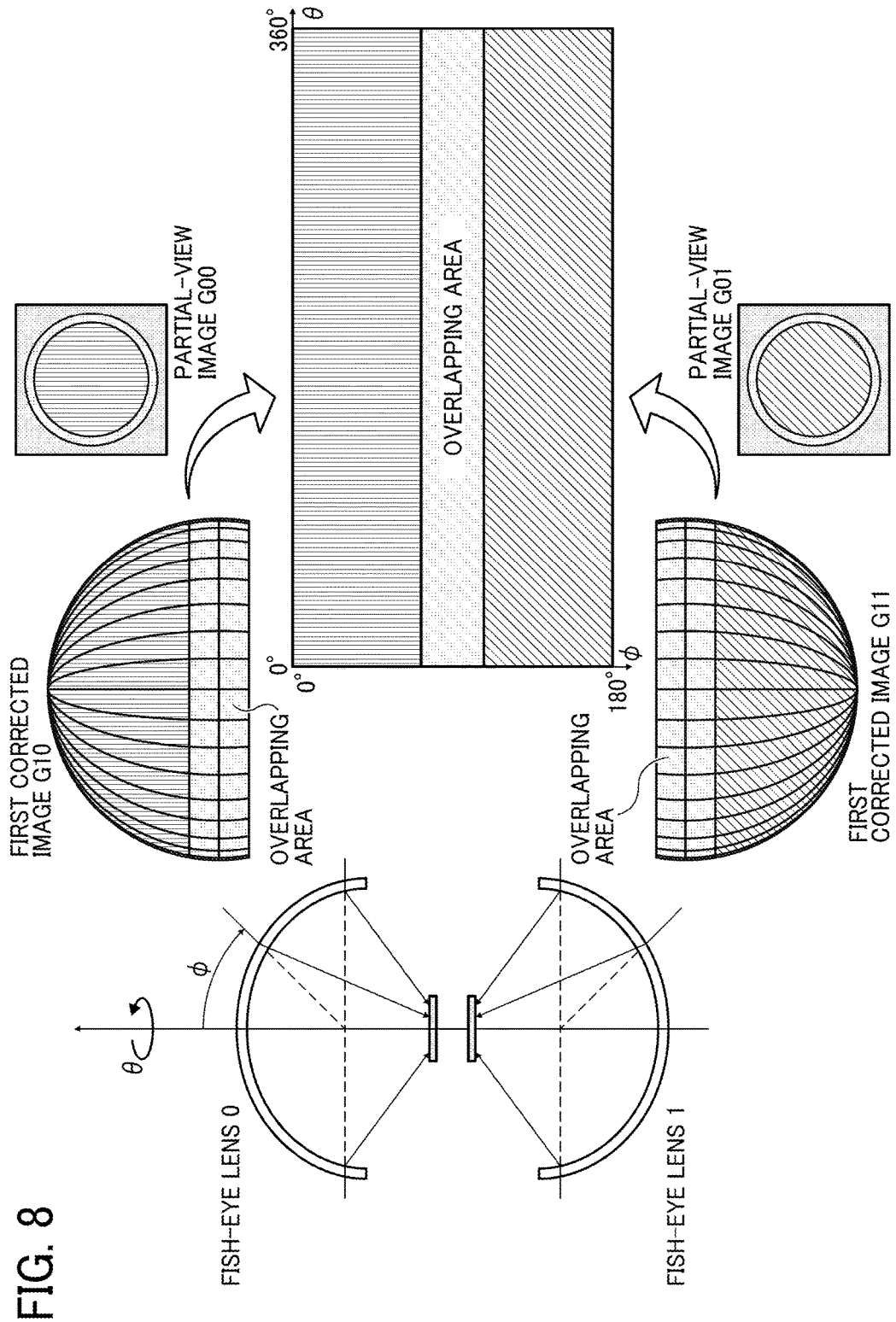
FIG. 8 is a diagram illustrating the mapping of the partial images onto a spherical coordinate system by a first distortion corrector, according to an embodiment of the present disclosure.

FIG. 8 is a diagram illustrating mapping for the partial images onto the spherical coordinate system by the first distortion corrector 202.

As a result of processing by the first distortion corrector 202, the two partial images G00 and G01 captured by the fisheye lenses are expanded on the spherical image format as illustrated in FIG. 8. The partial image G00 shot by a fisheye lens 0 is typically mapped onto the generally upper hemisphere of the sphere, and the partial image G01 shot by a fisheye lens 1 is mapped onto the generally lower hemisphere of the sphere. The first correction image G10 and first correction image G11 expressed in a spherical format each protrude from the hemisphere since the full angle of view of the fisheye lens exceeds 180 degrees. As a result, between the first correction image G10 and the first correction image G11, an overlapping area exists in which the image capturing range overlap between images.

As illustrated in FIG. 8, the first conversion table T1 is created so as to project optical axes of the two lens optical systems onto the two poles of the spherical surface ($\varphi=0$ degrees and 180 degrees) respectively, and project the overlapping area between the images onto the vicinity of the equator of the spherical surface ($\varphi=90$ degrees$\pm$((full angle of view−180 degrees)/2)). In the spherical coordinate system, according as the vertical angle $\varphi$ is close to the pole of 0 degrees or 180 degrees, distortion is increased and connection position detection accuracy is degraded. On the other hand, with the above-described projection, the overlapping area is positioned near the vertical angle 90 degrees in which a distortion amount of when the images are deviated in the $\theta$ direction is smaller. Thus, the position detector 204 described later performs pattern matching in the overlapping area, so that pattern matching accuracy can be improved.

As illustrated in FIG. 4, the position detector 204 includes a first detector 2041 and a second detector 2042, and accepts input of the first correction images G10 and G11 transformed by the first distortion corrector 202.

The first detector 2041 includes a misalignment-amount detector 20411 that corresponds to a first detector, a detection-result generator 20412 that corresponds to a calculator, and a first detection result holding unit 20413. The misalignment-amount detector 20411 performs pattern matching on the overlapping area between the first correction image G10 and the first correction image G11, thereby detecting the amount of misalignment between the both images with respect to the same subject.

Figure 9:
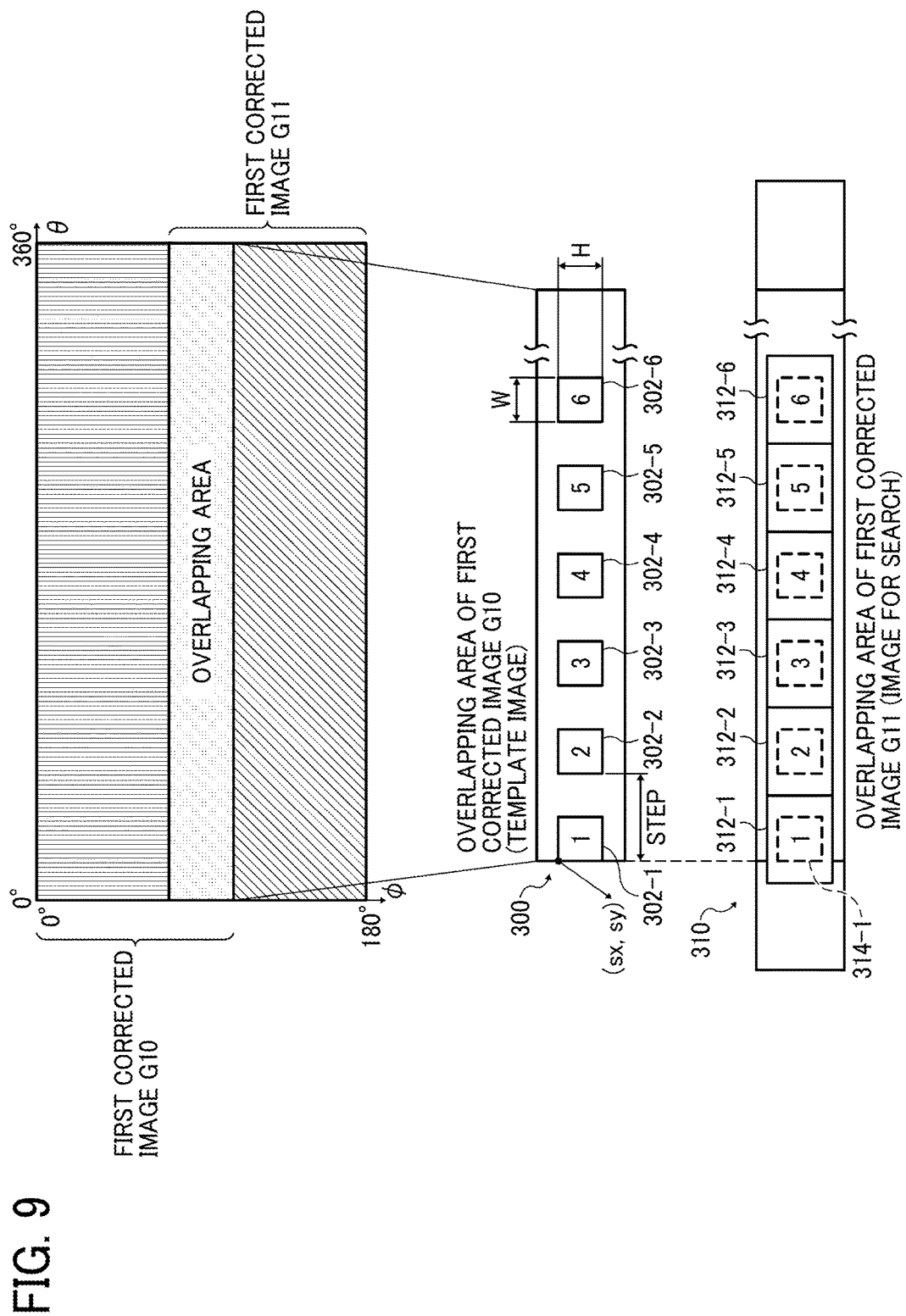
FIG. 9 is a diagram illustrating the operation of a misalignment-amount detector according to an embodiment of the present disclosure.

FIG. 9 is a diagram illustrating operation of the misalignment-amount detector 20411.

A template image 300 is an image of the overlapping area of the first correction image G10, and an image for search 310 is an image of the overlapping area of the first correction image G11. A block size is a pixel size configuring the template image, and a generation interval is an interval at which adjacent template images are generated. Generation start coordinates are coordinates from which the first template image is cut out. Incidentally, the block size and the generation interval may be determined in consideration of a desired connection accuracy and a processing amount.

When the block size is W pixels× H pixels, the generation start coordinates is (sx, sy), and the generation interval is step pixels, a plurality of template images 302-1 to 302-# is generated in an aspect illustrated in FIG. 9. The number of blocks # of the generated template is an integer value of a value obtained by dividing the horizontal direction size of the template image 300 (in the described embodiment, the width size in the spherical format) by the generation interval (step).

More specifically, a block size area (W pixels×H pixels) is cut out from the generation start coordinates (sx, sy) to generate a template image. After template image generation, the coordinates are updated to (sx+step, sy), and, as for the second and subsequent template, similarly, the block size area is specified from the updated coordinate to perform generation. Incidentally, in FIG. 9, an example is illustrated in which the horizontal direction size of the template image (W pixels) is smaller than the generation interval (step); however, it is not limited to this, the horizontal direction size may be the same as the generation interval. In addition, in the present embodiment, the template images are generated in one row and for one round in the $\theta$ direction in the overlapping area; however, it is not limited to this. For each of the plurality of template images 302-1 to 302-# generated here, a predetermined search area 312 is searched for corresponding portions 314 on the image for search 310. Specifically, the misalignment-amount detector 20411 performs pattern matching to search for the corresponding portion 314 on the image for search 310 corresponding to each of the template images 302-1 to 302-#, from the predetermined search area 312. Then, the misalignment-amount detector 20411 calculates the amount of misalignment between the template images 302-1 to 302-# and corresponding portions from 314-1 to 314-4, respectively. Incidentally, for the pattern matching, template matching can be used that is performed using a correlation coefficient, Manhattan distance, Euclidean distance, or residual sum of squares as a degree of similarity.

For example, there may be a case where the template image 302-1 of the first correction image G10 does not match even when being superimposed on the original coordinate value of the first correction image G11, and matches the corresponding portion 314-1 at the coordinate value ($\theta_1+\Delta\theta_1$, $\varphi_1+\Delta\varphi_1$) moved by a predetermined amount of misalignment ($\Delta\theta_1$, $\Delta\varphi_1$). At this time, in the first correction image G11, in the present situation, if the pixel value (corresponding portion 314-1) positioned at the coordinates ($\theta_1+\Delta\theta_1$, $\varphi_1+\Delta\varphi_1$) is positioned at the coordinates ($\theta_1$, $\varphi_1$), appropriate alignment can be made. Therefore, the misalignment-amount detector 20411 performs the above pattern matching for each of the template images (number is i=1-#) to generate a corresponding amount of misalignment ($\Delta\theta_i$, $\Delta\varphi_i$).

The detection-result generator 20412 calculates a correction amount ($\Delta\theta$, $\Delta\varphi$) being a shift amount for the coordinate value, for each coordinate value ($\theta$, $\varphi$) in the spherical format, on the basis of the amount of misalignment for each template image 302 detected by the misalignment-amount detector 20411. Then, the detection-result generator 20412 generates first detection-result data in which each coordinate value is associated with its correction amount, for each frame.

Here, a method for calculating the correction amount is not particularly limited. For example, the amount of misalignment ($\Delta\theta_i$, $\Delta\varphi_i$) for each template image (i) is set as a value of central coordinates of each template image and interpolated, whereby the correction amount for each coordinate value can be calculated.

Figure 10A:
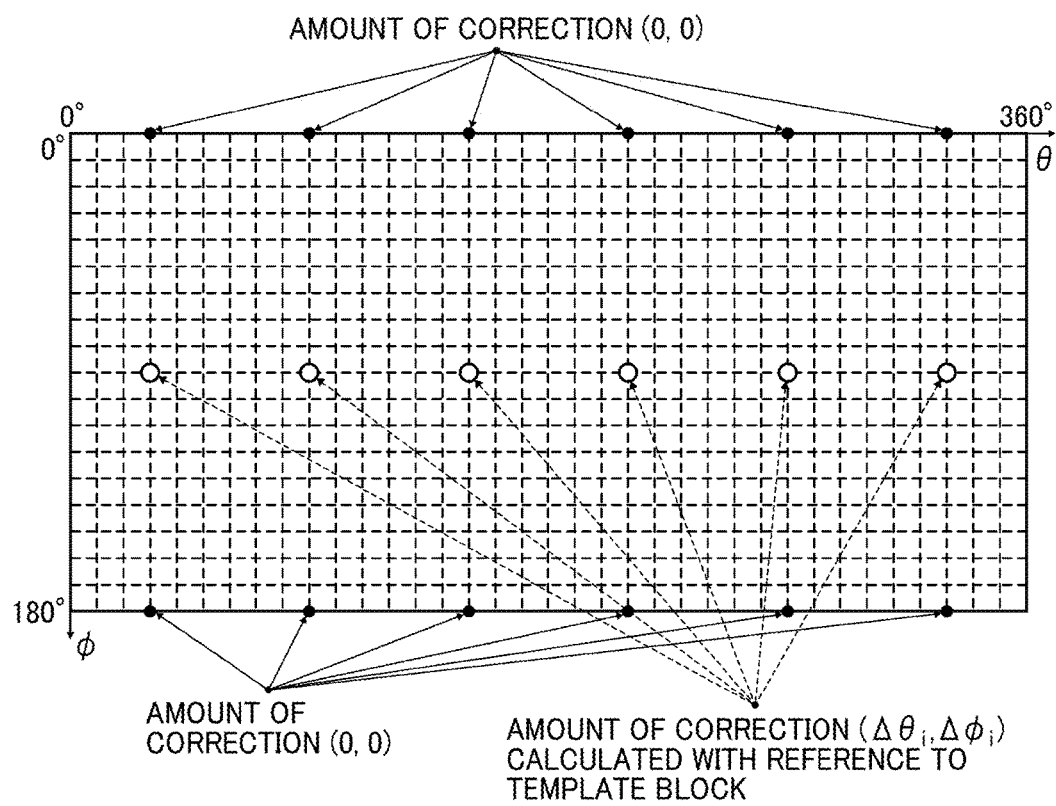
FIG. 10A and FIG. 10B are diagrams illustrating how a detection-result generator generates first detection-result data, according to an embodiment of the present disclosure.
Figure 10B:
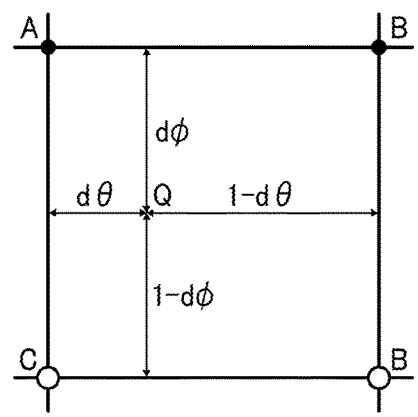

Specifically, first, as illustrated in FIG. 10A, the correction amount ($\Delta\theta$, $\Delta\varphi$) for each of the coordinates whose horizontal direction coordinate value $\theta$ is equal to the value of the central coordinates of the template block and that are positioned at the upper end ($\varphi=0$) and the lower end ($\varphi=1799$ when the height is 1800 pixels), is set as (0, 0). In addition, for other coordinates for which the correction amount is not set, as illustrated in FIG. 10B, a grid including four points set in the vicinity (illustrated by A to D in the figure) is considered, and the correction amount is calculated by two-dimensional linear interpolation operation in the grid. When a point Q internally divides the grid of four points into d$\theta$: 1−d$\theta$ in the $\theta$ axis direction, and d$\varphi$: 1−d$\varphi$ in the $\varphi$ axis direction, a correction amount ($\Delta\theta_Q$, $\Delta\varphi_Q$) at the point Q can be calculated by, for example, the following equation (1), using the correction amount of the four points in the vicinity (($\Delta\theta_A$, $\Delta\varphi_A$), . . . , ($\Delta\theta_D$, $\Delta\varphi_D$)).

[Equation 1]

$$\Delta\theta_Q = (1-d\phi) \times ((1-d\theta) \times \Delta\theta_A + d\theta \times \Delta\theta_B) + \\ d\phi \times ((1-d\theta) \times \Delta\theta_C + d\theta \times \Delta\theta_D) \\ \Delta\phi_Q = (1-d\phi) \times ((1-d\theta) \times \Delta\phi_A + d\theta \times \Delta\phi_B) + \\ d\phi \times ((1-d\theta) \times \Delta\phi_C + d\theta \times \Delta\phi_D)$$ (1)

Incidentally, in FIGS. 10A and 10B, for the upper end ($\phi$=0) and the lower end ($\phi$=1799 in the above example) in the spherical format, the correction amount (0, 0) is set. However, a method for calculating the correction amount ($\Delta\theta$, $\Delta\phi$) corresponding to each coordinate value ($\theta$, $\phi$) is not limited to this.

FIG. 11 is a diagram schematically illustrating an example of a data structure of the first detection-result data generated by the detection-result generator 20412.

As illustrated in FIG. 11, the detection-result generator 20412 generates the first detection-result data in which each coordinate value after conversion ($\theta$, $\phi$) is associated with the correction amount ($\Delta\theta$, $\Delta\phi$).

As illustrated in FIG. 4, the first detection result holding unit 20413 holds the first detection-result data generated by the detection-result generator 20412 for a plurality of frames. More particularly, the first detection result holding unit 20413 holds the first detection-result data in association with information (for example, frame number) by which frames can be identified of the first correction images G10 and G11 being generation sources of the first detection-result data. Incidentally, the number of pieces (frames) of the first detection-result data that can be held by the first detection result holding unit 20413 is not particularly limited.

The first detection-result data (correction amount) generated by the first detector 2041 is used as correction data for correcting parameters of the first conversion table T1 when images are combined. Then, on the basis of the corrected first conversion table T1, distortion correction is performed, whereby a combining position of when the partial images G00 and G01 are combined is corrected.

Figure 12:
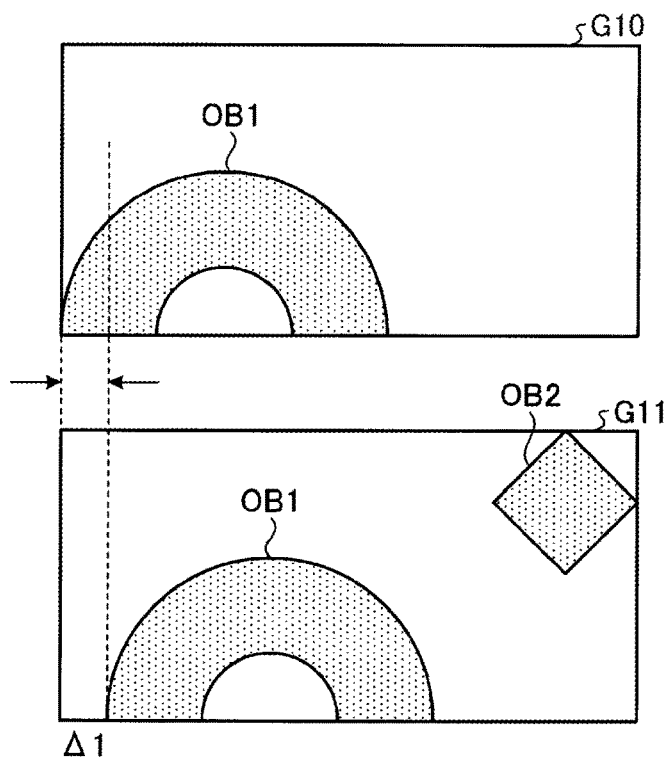
FIG. 12 is a diagram illustrating correction processes of a combining position, according to an embodiment of the present disclosure.
Figure 13:
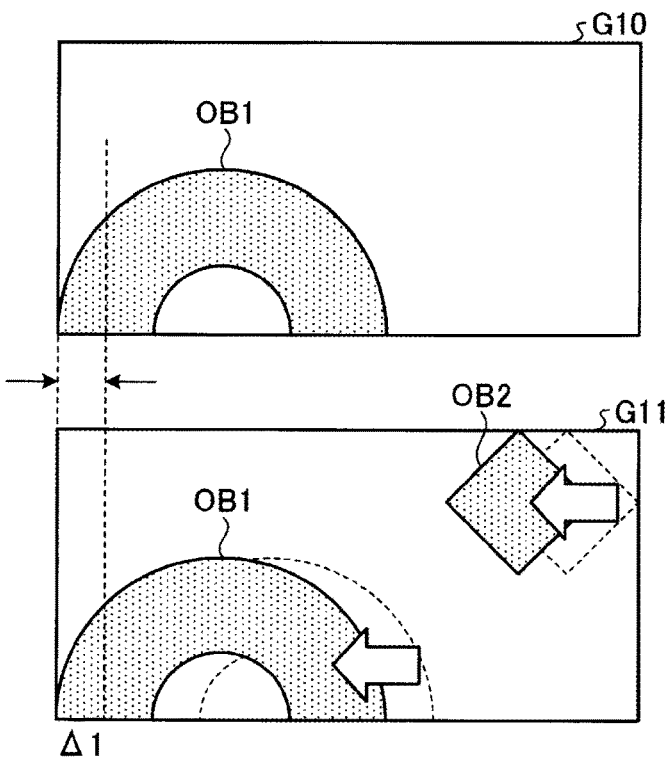
FIG. 13 is another diagram illustrating correction processes of a combining position, according to an embodiment of the present disclosure.

FIG. 12 and FIG. 13 are diagrams illustrating combining position correction processing.

Incidentally, in FIG. 12 and FIG. 13, for simplicity of description, the first correction images G10 and G11 of the same frame are arranged vertically.

A subject OB1 expressed by a semicircle is a dynamic subject whose position changes in temporally continuous frames, and positioned in the overlapping area of the first correction images G10 and G11. In addition, a subject OB2 expressed by a rhombus is a static subject whose position is fixed in temporally continuous frames, and positioned in another area other than the overlapping area of the first correction images G10 and G11 (non-overlapping area).

As illustrated in FIG. 12, when deviation of an amount of misalignment $\Delta1$ has occurred between the first correction image G10 and the first correction image G11 for the subject OB1, the misalignment-amount detector 20411 detects the amount of misalignment $\Delta1$ from the overlapping area.

The detection-result generator 20412 generates the correction amount for each coordinate value as the first detection-result data on the basis of the amount of misalignment $\Delta1$ detected by the misalignment-amount detector 20411. Here, when the first detection-result data is used to correct each coordinate value of the first conversion table T1, and the first conversion table T1 after the correction is used to generate the first correction image G11, each coordinate value of the first correction image G11 is shifted by the correction amount according to the amount of misalignment $\Delta1$, as illustrated in FIG. 13. In this way, the coordinate value after conversion is corrected on the basis of the amount of misalignment $\Delta1$ detected by the misalignment-amount detector 20411, whereby the positions of the subject OB1 existing in the overlapping area can be matched each other between the first correction image G10 and the first correction image G11.

However, when the above correction method is used to generate a moving image from the partial images G00 and G01, there may be a case of occurrence of a phenomenon in which a static subject appears to move. Hereinafter, this phenomenon will be described as a disadvantage of a related art with reference to FIG. 14.

Figure 14:
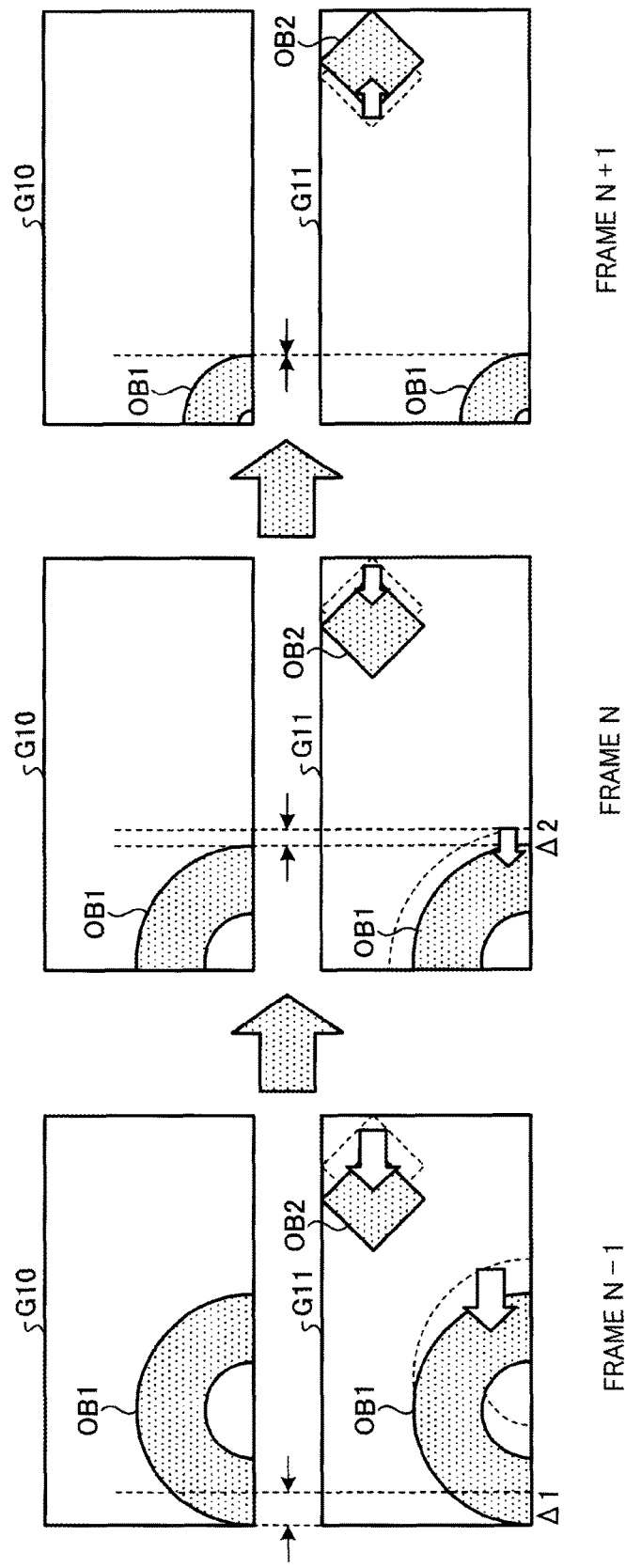
FIG. 14 is a diagram illustrating a disadvantage of a related art.

FIG. 14 is a diagram illustrating the disadvantage of the related art, and illustrates first correction images G10 and G11 for three temporally continuous frames (N−1, N, N+1).

Here, the frame N−1 is a diagram illustrating a relationship between the first correction image G10 and first correction image G11 after the misalignment-amount correction described in FIG. 13. The frame N−1, since the amount of misalignment is $\Delta1$ in the overlapping area as described above, illustrates a state in which each coordinate value of the first correction image G11 is shifted to the left by the correction amount according to the amount of misalignment.

The frame N is a diagram illustrating a relationship between the first correction image G10 and first correction image G11 of the frame next to the frame N−1. The frame N, since the amount of misalignment is $\Delta2$ ($\Delta2<\Delta1$) in the overlapping area, illustrates a state in which each coordinate value of the first correction image G11 is shifted to the left by the correction amount according to the amount of misalignment.

The frame N+1 is a diagram illustrating a relationship between the first correction image G10 and first correction image G11 of the frame next to the frame N. In the frame N+1, since positions of the subject OB1 match each other in the overlapping area, the amount of misalignment is zero. In this case, since the detection-result generator 20412 sets the correction amount zero for all coordinate values, each coordinate value of the first conversion table T1 is not corrected, and the first correction image G11 is held as it is.

Here, focusing on the subject OB2 of the first correction image G11, the position of the subject OB2 shifted in the frame N returns to the original position in the frame N+1. For that reason, when the frame N−1 to frame N+1 are observed as a moving image, the positions of the subject OB1 being a dynamic subject are the same, but from the frame N to the frame N+1, the subject OB2 being a static subject appears to move to the right. In this way, in the related art, since the correction amount according to the amount of misalignment is applied to the entire first correction image G11, when the partial images G00 and G01 are combined to generate a moving image, there may have been a case of occurrence of a phenomenon in which the static subject appears to move. Such a phenomenon is a cause of degradation in image quality, so improvement has been required.

Therefore, in the present embodiment, the second detector 2042 detects a static subject from the first correction image G11, and application is suppressed of the correction amount to the area in which the static subject exists. Hereinafter, the second detector 2042 will be described.

As illustrated in FIG. 4, the second detector 2042 includes a subject detector 20421 corresponding to a second detector, and a second detection result holding unit 20422.

The subject detector 20421 detects a static subject (or a dynamic subject) from the first correction image G11 being a search target image. More particularly, the first correction image G11 for the plurality of temporally continuous frames are compared with each other, whereby the static subject (or the dynamic subject) included in the first correction image G11 is detected for each frame. Incidentally, a method for detecting the static subject is not particularly limited, and a known technique may be used, such as pattern matching, or optical flow.

Here, operation of the subject detector 20421 will be described in a case where the pattern matching is used to detect the static subject, with reference to FIG. 15.

Figure 15:
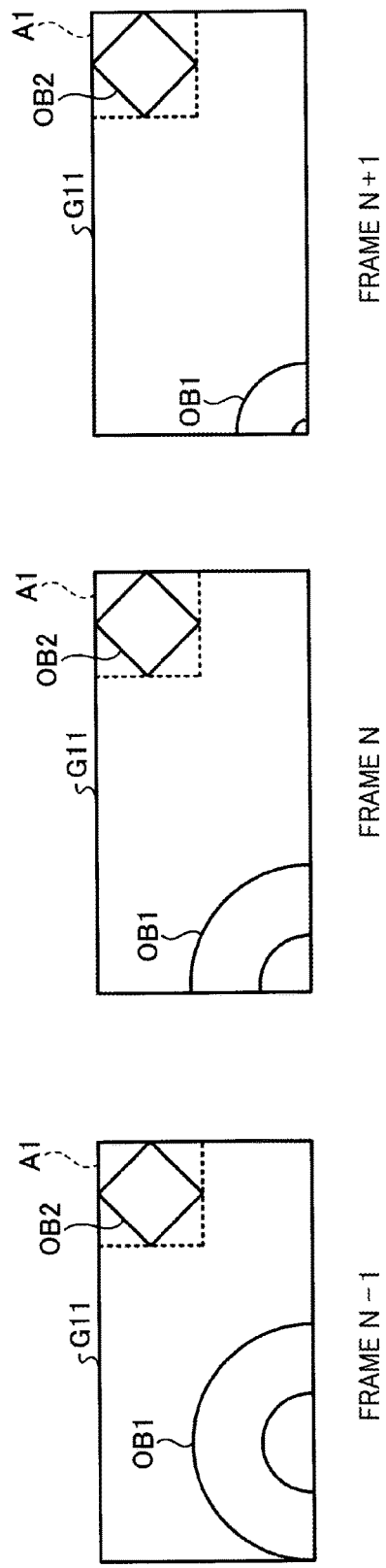
FIG. 15 is a diagram illustrating the operation of a subject detector according to an embodiment of the present disclosure.

FIG. 15 is a diagram illustrating operation of the subject detector 20421, and illustrates the first correction image G11 for three consecutive frames (N−1, N, N+1).

First, the subject detector 20421 performs edge enhancement processing and the like to the first correction image G11 to detect an area (subject area) expressing the shape of the subject included in the image. Thus, the subject detector 20421 detects the subjects OB1 and OB2 from the first correction image G11 of each frame. Incidentally, the subject detector 20421 preferably detects the subject from another area other than the overlapping area. More preferably, the subject detector 20421 detects a remaining subject excluding the subject partially or entirely included in the overlapping area, of the detected subjects.

Then, the subject detector 20421 performs pattern matching on the detected subject with the preceding and succeeding frames. Here, for the static subject, since the positions are substantially equivalent between the frames, the subject detector 20421 can detect the subject OB2 as a static subject from the result of the pattern matching. In addition, for the dynamic subject, since the positions vary (move) between the frames, the subject detector 20421 can detect the dynamic subject from the result of the pattern matching.

The subject detector 20421, when detecting the static subject (or the dynamic subject) from the first correction image G11, generates information indicating an area in which the subject exists, as second detection-result data. For example, in FIG. 15, the subject detector 20421 detects a rectangular area A1 surrounding the subject OB2 as the area in which the static subject exists. In this case, the subject detector 20421 generates coordinate values (θ, φ) of four corners of the area A1, coordinate values (θ, φ) of pixels included in the area A1, and the like as the second detection-result data. Incidentally, the shape of the area detected by the subject detector 20421 is not limited to a rectangle, and may be a circle, a polygon, and a contour itself obtained by edge enhancement.

In addition, when pattern matching is used for moving body detection, the subject detector 20421 may cooperate with the misalignment-amount detector 20411 to detect the static subject (or the dynamic subject) from the first correction image G11.

As illustrated in FIG. 4, the second detection result holding unit 20422 holds the second detection-result data detected by the subject detector 20421 for the plurality of frames. More particularly, the second detection result holding unit 20422 holds the second detection-result data in association with information by which a frame can be identified of the first correction image G11 being a generation source of the second detection-result data. Incidentally, the number of pieces (frames) of the second detection-result data that can be held by the second detection result holding unit 20422 is not particularly limited, and may be the same as that of the first detection result holding unit 20413.

The parameter corrector 206 is a functional unit that corresponds to a corrector. The parameter corrector 206 corrects the parameters of the first conversion table T1 on the basis of the data for each frame held by the first detection result holding unit 20413 and the second detection result holding unit 20422.

More particularly, the parameter corrector 206 sets the correction amount to zero of the area in which the static subject indicated by the second detection-result data exists, among the correction amounts of coordinate values included in the first detection-result data, to correct the first detection-result data. In addition, the parameter corrector 206 corrects the first conversion table T1 so that the image after conversion is aligned on the spherical coordinates on the basis of the corrected first detection-result data. Specifically, the parameter corrector 206 performs correction so as to associate (x, y) having been associated with (θ+Δθ, (φ+Δφ) before the correction with the input coordinate value (θ, φ), in the first conversion table T1 used for distortion correction of the partial image G01. Incidentally, for the first conversion table T1 used for distortion correction of the partial image G00, it is not necessary to correct the association.

Operation of the parameter corrector 206 will be described with reference to FIG. 16.

Figure 16:
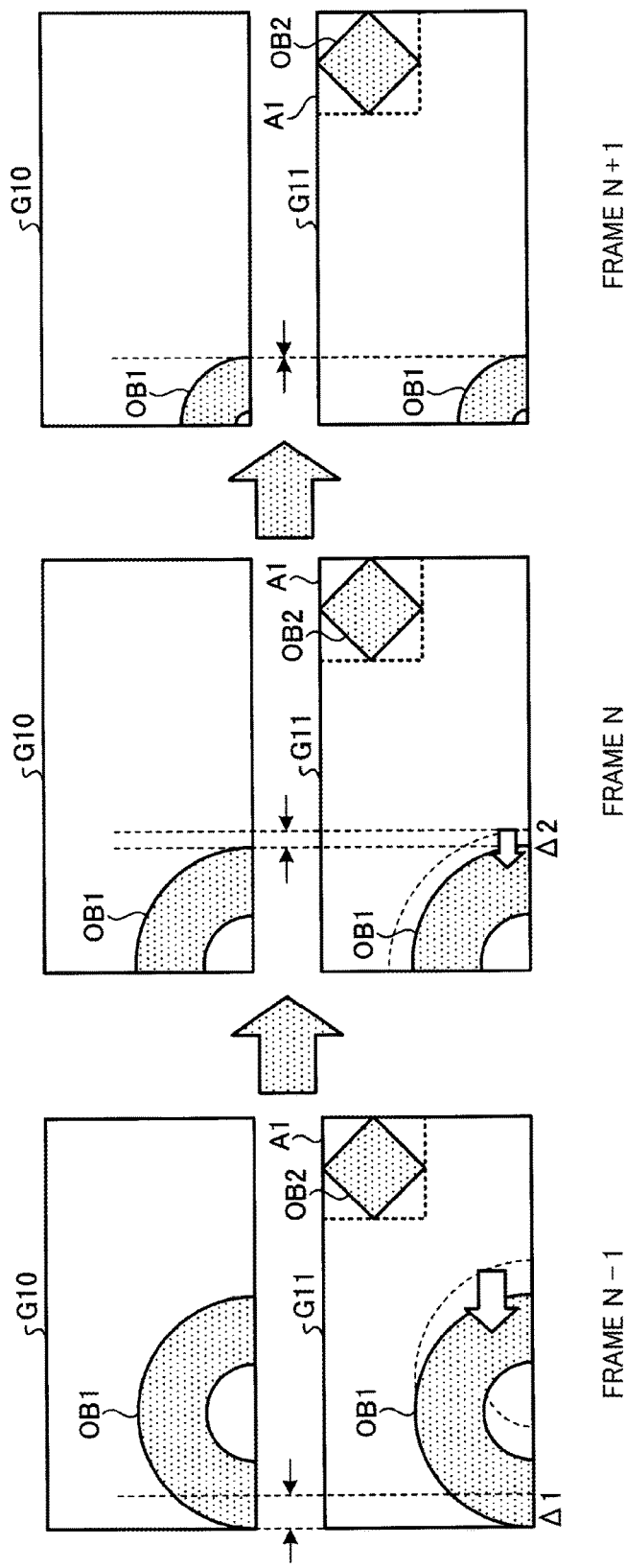
FIG. 16 is a diagram illustrating the operation of a parameter corrector according to an embodiment of the present disclosure.

FIG. 16 is a diagram illustrating the operation of the parameter corrector 206.

Incidentally, the first correction images G10 and G11 for three frames illustrated in FIG. 16 correspond to the first correction images G10 and G11 of the frames of FIG. 14 described above.

The first detection result holding unit 20413 holds the first detection-result data generated for the frames (N−1, N, N+1) by the above-described processing by the misalignment-amount detector 20411. In addition, the second detection result holding unit 20422 holds the second detection-result data indicating the area in which the static subject (subject OB2) exists detected from the frames (N−1, N, N+1) by the processing by the subject detector 20421.

The parameter corrector 206 corrects the parameters of the first detection-result data for each frame on the basis of the first detection-result data and second detection-result data held.

For example, the parameter corrector 206 sets the correction amount to zero of the coordinate value included in the area A1 indicated by the second detection-result data of the frame N−1, among the correction amounts (Δθ, Δφ) of the coordinate values included in the first detection-result data of the frame N−1, to perform invalidation. Then, the parameter corrector 206 corrects the parameters of the first conversion table T1 on the basis of the corrected first detection-result data. In addition, the parameter corrector 206 performs the above processing similarly for the frames N and N+1 to correct the first conversion table T1 for each frame.

Here, in the first correction image G11 of each frame subjected to distortion correction with the first conversion table T1 after correction, the position of the dynamic subject (subject OB1) is shifted in accordance with the correction amount, and the position of the static subject (subject OB2) is maintained as it is. In this way, in the imaging system 10 of the present embodiment, the range to which the correction amount is applied is the area in which the dynamic subject (subject OB1) exists, and the correction amount is set to zero for the area in which the static subject (subject OB2) exists, whereby occurrence is suppressed of the phenomenon in which the static subject appears to move described in FIG. 14.

Incidentally, when the second detection-result data indicates the area in which the dynamic subject exists, the parameter corrector 206 sets the correction amount to zero of a remaining area excluding the area indicated by the second detection-result data, to correct the first detection-result data.

As illustrated in FIG. 4, the table generator 208 is a functional unit that corresponds to a data generator. The table generator 208 performs rotational coordinate transformation to the first conversion table T1 corrected by the parameter corrector 206, to generate the second conversion table T2 (second conversion data) for image combination. Hereinafter, operation will be described of the table generator 208 related to generation of the second conversion table T2, with reference to FIG. 17.

Figure 17:
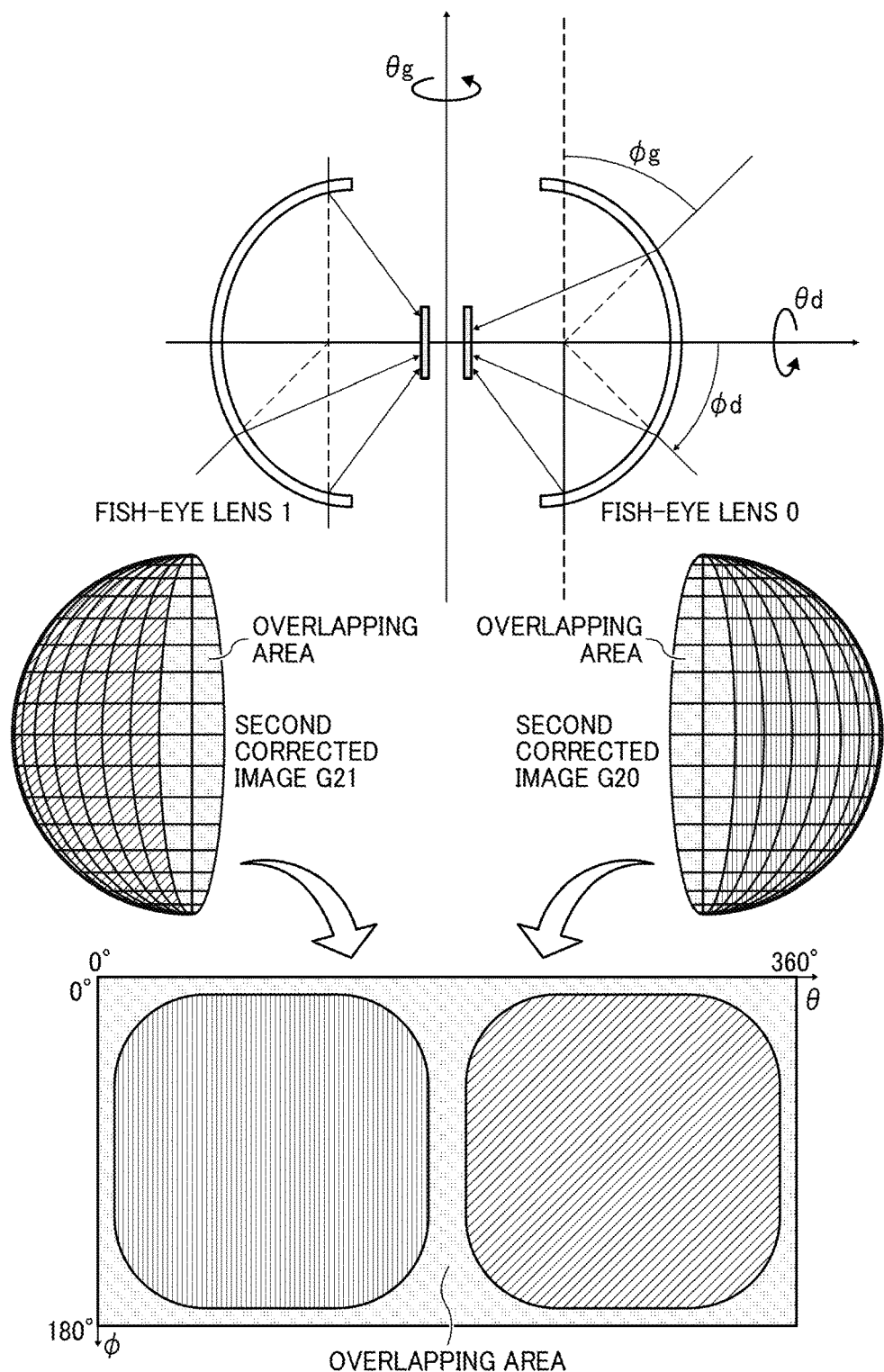
FIG. 17 is a diagram illustrating the mapping of two partial images onto a spherical coordinate system, according to an embodiment of the present disclosure.

FIG. 17 is a diagram illustrating mapping for two partial images onto a spherical coordinate system.

The table generator 208 executes the following processing for each coordinate value $(\theta_g, \varphi_g)$ in the spherical coordinate system for image combination being an input value of the second conversion table T2. Incidentally, the range of the coordinate value to be set becomes a range defined by the entire range of the horizontal angle (from 0 degrees to 360 degrees) and the entire range of the vertical angle (from 0 degrees to 180 degrees). In addition, in order to perform conversion processing for all coordinate values to be input values, each coordinate value is set in order here.

First, the table generator 208 obtains the coordinate value $(\theta_d, \varphi_d)$ in the spherical coordinate system corresponding to the coordinate value $(\theta_g, \varphi_g)$ by rotational coordinate transformation. By the rotational coordinate transformation, it is transformed from a definition of coordinates axes of a horizontal angle $\theta_d$ and a vertical angle $\varphi_d$ based on the optical axis of one lens optical system as illustrated in FIG. 8 into a definition of a horizontal angle $\theta_g$ and a vertical angle $\varphi_g$ based on an axis vertical to the optical axis as illustrated in FIG. 17. The coordinates $(\theta_d, \varphi_d)$ corresponding to the coordinates $(\theta_g, \varphi_g)$ can be calculated by the following equation (2) on the basis of the rotational coordinate transformation, using a radius vector of 1, three-dimensional orthogonal coordinates $(x_g, y_g, z_g)$ corresponding to coordinates $(\theta_g, \varphi_g)$ in the spherical coordinate system for image combination, and three-dimensional orthogonal coordinates $(x_d, y_d, z_d)$ corresponding to coordinates $(\theta_d, \varphi_d)$ in the spherical coordinate system for position detection. Incidentally, in the following equation (2), a coefficient $\beta$ is a rotation angle defining rotational coordinate transformation around the x-axis in the three-dimensional orthogonal coordinates, and is 90 degrees in the described embodiment.

[Equation 2]

$$\begin{aligned}x_g &= \sin(\phi_g)\cos(\theta_g) \\ y_g &= \sin(\phi_g)\sin(\theta_g) \\ z_g &= \cos(\phi_g) \\ \begin{pmatrix}x_d \\ y_d \\ z_d\end{pmatrix} &= \begin{pmatrix}1 & 0 & 0 \\ 0 & \cos\beta & \sin\beta \\ 0 & -\sin\beta & \cos\beta\end{pmatrix}\begin{pmatrix}x_g \\ y_g \\ z_g\end{pmatrix} \\ \phi_d &= \mathrm{Arccos}(z_d) \\ \theta_d &= \mathrm{Arctan}\left(\frac{y_d}{x_d}\right)\end{aligned} \quad (2)$$

In the first conversion table T1, the optical axis is projected onto the pole of the spherical surface, the overlapping area between the images is projected onto the vicinity of the equator of the spherical surface, and the vertical direction of the spherical image format and the zenith direction of the shot scene do not match each other. In contrast, by the rotational coordinate transformation, the second conversion table T2 projects the optical axis onto the equator of the spherical surface, and the vertical direction of the spherical image format and the zenith direction of the shot scene match each other.

The table generator 208 refers to a conversion table for detecting a connection position after correction to obtain the coordinate value (x, y) of the partial image (0, 1) associated with $(\theta_d, \varphi_d)$, for each partial image G00 and partial image G01. Incidentally, the first conversion table T1 and the second conversion table T2 hold coordinate values (x, y) corresponding to $\theta_d$ and $\varphi_d$ both in one pixel increments; however, the coordinate value $(\theta_d, \varphi_d)$ calculated by the conversion is typically acquired with a value after the decimal point. Conveniently, for the coordinate values (x, y) of the associated partial images G00 and G01, coordinate values (x, y) associated with coordinate values existing in the table closest to the calculated coordinate values $(\theta_d, \varphi_d)$ can be adopted. In addition, in a preferred embodiment, it is also possible to refer to a plurality of coordinate values (x, y) associated with the closest coordinate value and its surrounding coordinate values among the coordinates existing in the table, perform weighted interpolation in accordance with a distance from the calculated coordinates $(\theta_d, \varphi_d)$, and calculate the coordinate values (x, y) of the associated partial images G00 and G01. The table generator 208 performs the above calculation for all partial images G00 and G01 to generate all data of the second conversion table T2.

As illustrated in FIG. 4, the second distortion corrector 210 is a functional unit that corresponds to a second data converter. The second distortion corrector 210 uses the second conversion table T2 to perform distortion correction to the original partial image G00 and the partial image G01, and obtains a second correction image G20 and a second correction image G21 for image combination. Thus, as a result of processing by the second distortion corrector 210, two partial images G00 and G01 captured by the fisheye lenses are expanded on the spherical image format as illustrated in FIG. 17. The partial image G00 shot by the fisheye lens 0 is typically mapped onto the generally left hemisphere of the sphere, and the partial image G01 captured by the fisheye lens 1 is mapped onto the generally right hemisphere of the sphere.

Comparing FIG. 17 with FIG. 8, the partial image G00 and partial image G01 are mapped onto different positions with respect to the spherical format, and the zenith direction of the scene matches the φ direction being the vertical direction of the image. The center portions of the partial images G00 and G01 are mapped onto the equator with less distortion, and the overlapping area between the second correction image G20 and the second correction image G21 is mapped onto an area near the vertical angle 0 degrees and 180 degrees, and the horizontal angle 0 degrees and 180 degrees, different from those illustrated in FIG. 8.

The image combiner 212 is a functional unit that corresponds to an image combiner. The image combiner 212 combines the second correction image G20 and the second correction image G21. In image-combining processes, for the overlapping area in which the images overlap, blend processing or the like is performed, and for the area in which only pixel values of one of the images exist, the existing pixel values are adopted as they are. By the above image-combining processes, two partial images captured by the fisheye lenses generate one spherical image.

The functional block illustrated in FIG. 4 can further include a display image generator 214. The display image generator 214 executes image processing for projecting the spherical image onto a planer display device to generate a display image.

Figure 18:
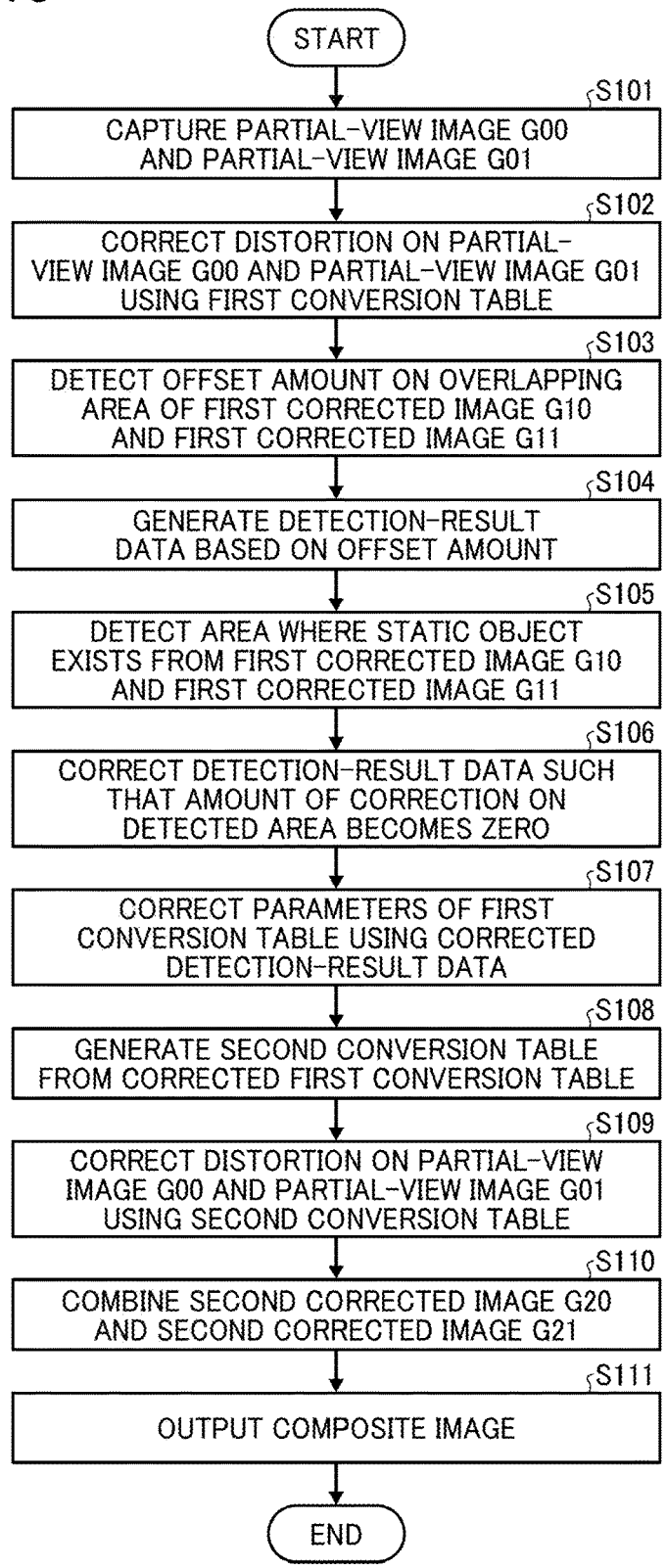
FIG. 18 is a flowchart illustrating image-combining processes executed by an imaging system according to an embodiment of the present disclosure.

FIG. 18 is a flowchart illustrating an example of image-combining processes executed in the imaging system 10. The processing illustrated in FIG. 18 is started in response to an instruction to shoot a moving image by depression of the shutter button 18, for example.

First, the solid-state image capturing devices 22A and 22B start shooting the partial image G00 and the partial image G01 (step S101). Then, the first distortion corrector 202 uses the first conversion table T1 to perform distortion correction to the partial image G00 and the partial image G01, and generates the first correction images G10 and G11 (step S102). At this time, the first distortion corrector 202 may perform correction according to the vertical direction to the first conversion table T1 on the basis of a sensing result of the three-axis acceleration sensor 120.

Subsequently, the first detector 2041 (misalignment-amount detector 20411) detects the amount of misalignment between images in the overlapping area of the first correction images G10 and G11 (step S103). Then, the first detector 2041 (detection-result generator 20412) generates the correction amount for all coordinate values on the basis of the amount of misalignment detected in step S103 (first detection-result data) (step S104). The generated first detection-result data is held in the first detection result holding unit 20413.

In addition, the second detector 2042 (subject detector 20421) detects the area in which the static subject exists, and generates the second detection-result data in the non-overlapping area of the first correction images G10 and G11 (step S105). The generated second detection-result data is held in the second detection result holding unit 20422.

Subsequently, the parameter corrector 206 sets the amount of misalignment of the area in which the static subject exists to zero to correct the first detection-result data on the basis of the first detection-result data and second detection-result data of the same frame (step S106). Then, the parameter corrector 206 uses the corrected first detection-result data to correct the parameters (coordinate values) of the first conversion table T1 so that the images are aligned on the spherical coordinates (step S107). The parameter corrector 206 performs rotational coordinate conversion to the first conversion table T1 corrected in step S107 to generate the second conversion table T2 for each frame (step S108).

Subsequently, the second distortion corrector 210 uses the second conversion table T2 to perform distortion correction to the original partial images G00 and G01, and sequentially generates the second correction images G20 and G21 (step S109). Then, the image combiner 212 sequentially combines the second correction images G20 and G21 for each generated frame (step S110). By the above image-combining processes, the partial images G00 and G01 for each frame captured by the fisheye lenses generate a composite image (moving image) of the spherical image. Then, the image combiner 212 outputs the generated composite image to an external storage or the like (step S111), and ends the present processing.

As described above, the imaging system 10 of the present embodiment detects the amount of misalignment from the overlapping area of the first correction image G10 and the first correction image G11, and, on the basis of the amount of misalignment, generates the correction amount of each parameter of the first conversion table T1, as the first detection-result data. In addition, the imaging system 10 detects the area in which the static (dynamic) subject exists from the first correction image G11. Then, the imaging system 10, when correcting the parameters of the first conversion table T1, invalidates (to be zero) the correction amount of the area in which the static subject exists, and uses the correction amount of the area in which the dynamic subject exists to perform correction. Thus, in the imaging system 10, the range to which the correction amount is applied can be limited to another area excluding the area in which the static subject exists, that is, the area in which the dynamic subject exists, so that the position in which the static subject exists can be held. Therefore, the imaging system 10, when generating the moving image from the partial images G00 and G01, is capable of suppressing occurrence of the phenomenon in which the static subject appears to move, and improving quality of the obtained moving image (spherical image).

OTHER EMBODIMENTS

In the above-described embodiment, the imaging system 10 has been described that shoots the spherical still image by the image capturing optical system included in itself, and performs synthesizing with its internal distortion correction image combination block. However, the configuration of the image processing device and imaging system is not limited to this. For example, the above image processing device may be a camera processor or the like configured to receive input of a plurality of partial images (moving images or still images) shot by a plurality of image capturing optical systems, to generate a spherical image (moving image or still image). The above image processing device may be an information processing apparatus such as a personal computer, a work station, a virtual machine on a physical computer system, or a mobile information terminal such as a smart phone or a tablet configured to accept input of a plurality of partial images (moving images or still images) shot by an image capturing apparatus exclusively in charge of shooting, to combine a spherical image (moving image or still image). An imaging system may be configured to include an image processing device such as the above-described camera processor, an information processing apparatus, or a mobile information terminal, and an image capturing optical system separated from the image processing device.

Hereinafter, with reference to FIG. 19A and FIG. 19B and FIG. 20, an imaging system in another embodiment will be described including an image capturing apparatus and an external computer apparatus that receives input of a plurality of partial images shot by the image capturing apparatus to generate a spherical image.

Figure 19B:
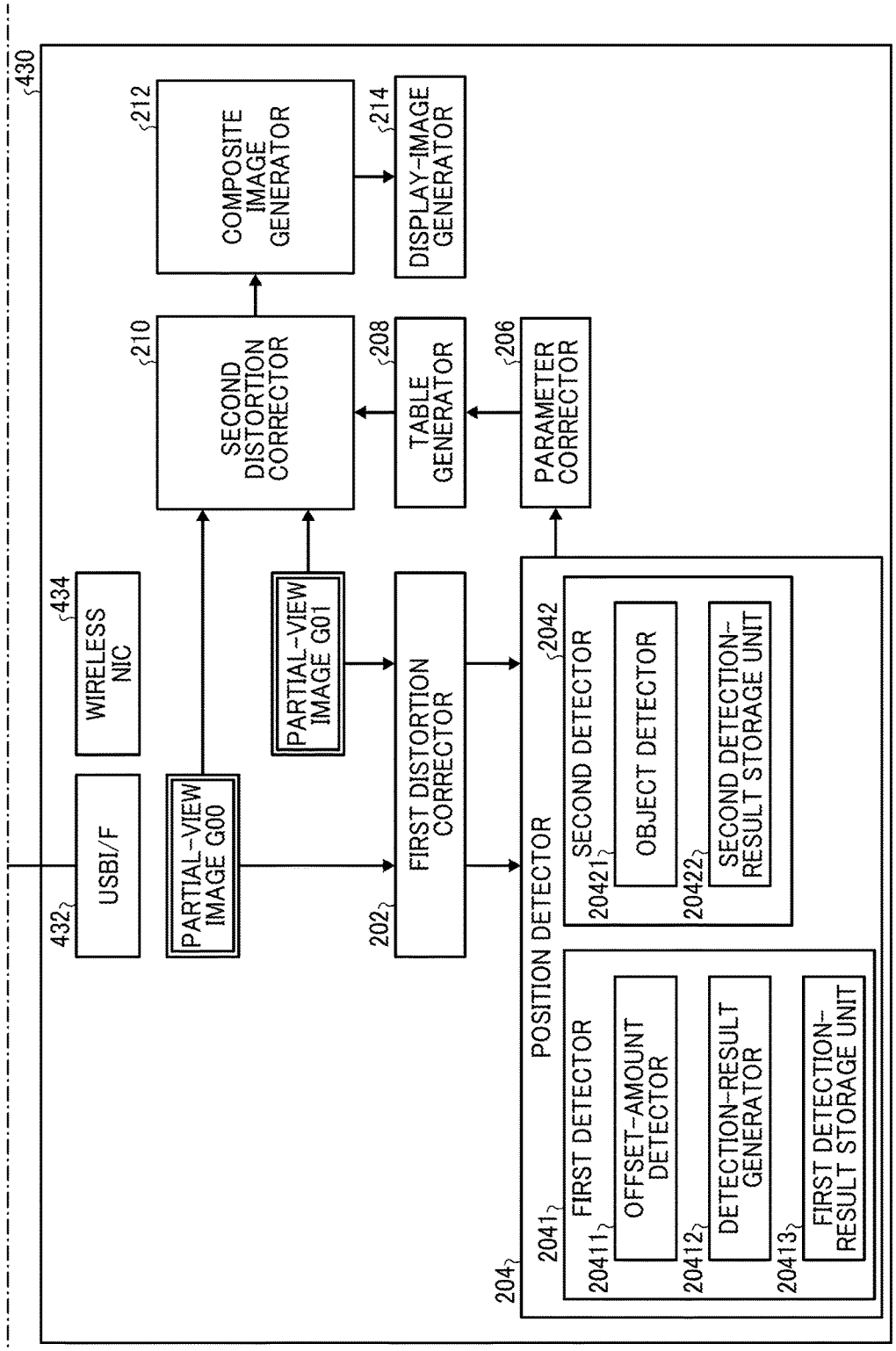

FIG. 19A and FIG. 19B are a schematic diagram illustrating an imaging system 400 according to the other embodiment.

The imaging system 400 illustrated in FIG. 19A and FIG. 19B includes an image capturing apparatus 410 in charge of image capturing, and a computer apparatus 430 that is coupled to the image capturing apparatus 410 and in charge of image processing. FIG. 19A and FIG. 19B illustrate only a main configuration. Elements similar to those in the above-described embodiment are denoted by the same reference numerals. The imaging system 400 according to the present embodiment illustrated in FIG. 19A and FIG. 19B and FIG. 20 includes a similar configuration as the above-described embodiment, except that image processing for synthesizing the spherical image is performed exclusively in the computer apparatus 430. Hereinafter, differences will be mainly described.

In the embodiment illustrated in FIG. 19A and FIG. 19B, the image capturing apparatus 410 includes a digital still camera processor 100, a lens barrel unit 102, and a three-axis acceleration sensor 120 coupled to the processor 100.

The processor 100 includes ISPs 108A and 108B, a USB block 146, and a serial block 158, and controls USB communication with the computer apparatus 430 coupled via a USB connector 148. The serial block 158 is coupled to a wireless NIC 160, and controls wireless communication with the computer apparatus 430 coupled via a network.

The computer apparatus 430 can be configured as a general purpose computer such as a desktop personal computer, or a work station. The computer apparatus 430 includes hardware components such as a processor, memory, ROM, and storage. The computer apparatus 430 includes a USB interface 432 and a wireless NIC 434, and is coupled to the image capturing apparatus 410 via a USB bus or the network.

The computer apparatus 430 further includes a first distortion corrector 202, a position detector 204, a parameter corrector 206, a second distortion corrector 210, and an image combiner 212, as processing blocks related to image combination. In the present embodiment, two partial images captured by a plurality of image capturing optical systems of the lens barrel unit 102 and a first conversion table T1 of the image capturing apparatus 410 are transferred to the computer apparatus 430 via the USB bus or the network.

In the computer apparatus 430, the first distortion corrector 202 uses the first conversion table T1 to perform distortion correction to partial images G00 and G01 transferred from the image capturing apparatus 410, and generates first correction images G10 and G11. A first detector 2041 (misalignment-amount detector 20411) of the position detector 204 detects the amount of misalignment between the first correction images G10 and G11, and generates first detection-result data. A second detector 2042 (subject detector 20421) of the position detector 204 detects a static subject (or a dynamic subject) from the first correction image G11 being a search target image, and generates second detection-result data.

The parameter corrector 206 corrects the parameters of the first conversion table T1 on the basis of data for each frame held by a first detection result holding unit 20413 and a second detection result holding unit 20422. A table generator 208 performs rotational coordinate transformation to the first conversion table T1 corrected by the parameter corrector 206 to generate a second conversion table T2 for image combination.

The second distortion corrector 210 uses the second conversion table T2 to perform distortion correction to the original partial image G00 and partial image G01, and generates second correction images G20 and G21 for image combination. The image combiner 212 combines the second correction images G20 and G21, and generates a composite image in a spherical image format.

The functional block illustrated in FIG. 19A and FIG. 19B can further include a display image generator 214. The display image generator 214 executes image processing for projecting the spherical image onto a planer display device to generate a display image. The computer apparatus 430 according to the present embodiment reads a program from the ROM or hard disk drive (HDD), and expands the program in a work space provided by a random access memory (RAM), thereby realizing each functional unit described above and each processing described later, under the control of a CPU.

Incidentally, FIG. 19A and FIG. 19B illustrate the imaging system separately configured; however, the system is not limited to this configuration. Each functional unit for realizing the imaging system can be distributed and implemented in various aspects, on one or more image capturing apparatuses and one or more computer systems.

FIG. 20 is a flowchart illustrating an example of image-combining processes performed in the imaging system 400.

FIG. 20 illustrates a flow from when the captured image is input by the image capturing apparatus 410 until the image is stored in the computer apparatus 430.

The processing illustrated in FIG. 20 is started in response to an instruction to shoot a moving image by depression of a shutter button in the image capturing apparatus 410, for example. First, processing within the image capturing apparatus 410 is executed.

First, in the image capturing apparatus 410, solid-state image capturing devices 22A and 22B shoot the partial image G00 and the partial image G01 (step S201). Then, the image capturing apparatus 410 transfers the partial image G00 and the partial image G01 to the computer apparatus 430 via the USB bus or the network (step S202). Besides, the first conversion table T1 is transferred to the computer apparatus 430 via the USB bus or the network. At this time, when tilt correction is also performed in the computer apparatus 430 side, tilt information acquired by the three-axis acceleration sensor 120 is transferred to the computer apparatus 430.

Incidentally, the first conversion table T1 of the image capturing apparatus 410 described above may be transferred when the image capturing apparatus 410 and the computer apparatus 430 recognize each other. That is, it is sufficient that the first conversion table T1 is transferred to the computer apparatus 430 once. The first conversion table T1 is stored in a recording medium, for example, and the first conversion table T1 is read from the recording medium and transferred to the computer apparatus 430.

Meanwhile, in the computer apparatus 430, the first distortion corrector 202 uses the first conversion table T1 to perform distortion correction to the transferred partial image G00 and the partial image G01, and generates the first correction images G10 and G11 (step S203). Incidentally, when tilt correction is performed in the computer apparatus 430 side being a transfer destination, correction according to the vertical direction may be performed in advance to a conversion table for detecting a position on the basis of the transferred tilt information.

Since processing of subsequent steps S204 to S212 is similar to the processing of steps S103 to S111 of FIG. 18 described above, the description will be omitted. Operation according to the flowchart in the other embodiment illustrated in FIG. 20 also can be executed by the program on the computer. That is, a CPU for controlling operation of the image capturing apparatus 410 and a CPU for controlling operation of the computer apparatus 430 respectively read programs stored in the recording medium such as the ROM or RAM and expand the programs on the memories, thereby realizing processing of each part in charge of the above-described spherical image-combining processes.

According to the embodiment described above, it is possible to provide the image processing device, image processing method, program, and imaging system capable of suppressing occurrence of the phenomenon in which the static subject appears to move when the combining position of the image is corrected.

For example, in the above embodiment, the first distortion corrector 202 and the second distortion corrector 210 are separated from each other so as to enable pipeline operation; however, not limited to this, the first distortion corrector 202 and the second distortion corrector 210 may be integrated together.

In the above embodiment, the image-combining processes of FIG. 18 (FIG. 20) has been performed regardless of the shooting mode of the still image and the moving image; however, not limited to this, the method for correcting the first conversion table T1 may be switched in accordance with the shooting mode. Specifically, when the shooting mode is the moving image, as described above, the correction amount is invalidated of the area in which the static subject exists, and the correction amount is used of the area in which the dynamic subject exists and some parameters are corrected of the first conversion table T1. When the shooting mode is the still image, as described in FIG. 14, the first detection-result data generated by a detection-result generator 20412 is used and all parameters are corrected of the first conversion table T1.

In the above embodiment, two partial images have been combined. However, the present disclosure may be applied to synthesis of three or more partial images. In addition, in the above embodiment, the description has been made of the imaging system using the fisheye lenses as an example; however, the present disclosure may be applied to a spherical imaging system using super wide-angle lenses. Further, in the above-described preferred embodiment, synthesis of the spherical image has been described; however, it is needless to say that the present disclosure is not particularly limited to this and can be applied to any image processing for detecting a connection position of a plurality of images.

The program executed in the image processing device and imaging system of the above embodiment may be stored on the computer coupled to the network such as the Internet, and provided by downloading via the network.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present disclosure may be embodied in the form of a computer program stored on any kind of storage medium. Examples of storage media include, but are not limited to, flexible disks, hard disks, optical discs, magneto-optical discs, magnetic tape, nonvolatile memory cards, read only memory (ROM), etc. Alternatively, any one of the above-described and other methods of the present disclosure may be implemented by ASICs, prepared by interconnecting an appropriate network of conventional component circuits, or by a combination thereof with one or more conventional general-purpose microprocessors and/or signal processors programmed accordingly.

The hardware platform includes any desired kind of hardware resources including, for example, a CPU, a RAM, and a HDD. The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

An imaging system includes an image capturing unit, an acquisition unit configured to acquire a plurality of captured images in which image capturing ranges partially overlap, the images being captured by the image capturing unit, a first data converter configured to convert the plurality of captured images into images in a coordinate system different from a coordinate system for the captured images, based on first conversion data, a first detector configured to detect an amount of misalignment in an overlapping area in which the image capturing ranges overlap, between a first conversion image being a reference image and a second conversion image being a comparison image, of a plurality of conversion images generated by conversion by the first data converter, a calculator configured to calculate correction amounts for the first conversion data related to generation of the second conversion image for each coordinate value of the second conversion image, based on the amount of misalignment detected by the first detector, a second detector configured to detect a subject area in which a subject exists from the second conversion image, a corrector configured to use a correction amount of a subject area in which a dynamic subject exists, among the correction amounts calculated by the calculator, to correct the first conversion data related to generation of the second conversion image, and a data generator configured to perform rotational coordinate transformation to the first conversion data corrected by the corrector, to generate second conversion data for image combination defining conversion of the plurality of captured images.

The invention claimed is:

1. An image processing device comprising:
processing circuitry configured to
perform a conversion to convert a plurality of captured images in which image capturing ranges partially overlap into images in a coordinate system different from a coordinate system for the captured images, based on first conversion data;
detect an amount of misalignment in an overlapping area in which the image capturing ranges overlap, between a first conversion image being a reference image and a second conversion image being a comparison image, of a plurality of conversion images generated by the conversion;
calculate correction amounts for the first conversion data related to generation of the second conversion image for each coordinate value of the second conversion image, based on the amount of misalignment detected;
detect a subject area in which a subject exists from the second conversion image;
correct the first conversion data related to generation of the second conversion image, using one of the correction amounts of a subject area in which a dynamic subject exists;
perform rotational coordinate transformation to the corrected first conversion data, to generate second conversion data for image combination defining conversion of the plurality of captured images;
convert the plurality of captured images input by frames into images in the coordinate system different from the coordinate system for the captured images, based on the second conversion data, and generate a plurality of images for combination; and
combine the plurality of images for combination for each frame, and generate a composite image expressed in the coordinate system different from the coordinate system for the captured images.

2. The image processing device according to claim 1, wherein the processing circuitry performs pattern matching on a common subject in the overlapping area between the first conversion image and the second conversion image, to detect an amount of misalignment of a position in which the subject exists.

3. The image processing device according to claim 1, wherein the processing circuitry detects the subject area from a non-overlapping area other than the overlapping area of the second conversion image.

4. The image processing device according to claim 1, wherein the processing circuitry detects the subject area in which the subject exists from the second conversion images in a plurality of temporally continuous frames, and determines whether the subject existing in the subject area is static or dynamic, based on change in position of the subject area.

5. The image processing device according to claim 1, wherein
the plurality of captured images is captured by using lens optical systems different from each other, and
the first conversion data includes a plurality of parameters for correcting distortion of the lens optical systems respectively capturing the plurality of captured images and projecting coordinate values of pixels of the captured images onto a coordinate system different from the coordinate system for the captured images.

6. The image processing device according to claim 1, wherein
the captured images are each captured by a lens optical system having an angle of view greater than 180 degrees, and
the composite image is a spherical image expressed by at least two angles of deviation.

7. A method of processing an image, implemented by an image processing device, the method comprising:
converting a plurality of captured images in which image capturing ranges partially overlap into images in a coordinate system different from a coordinate system for the captured images, based on a first conversion data;
detecting an amount of misalignment in an overlapping area in which the image capturing ranges overlap, between a first conversion image being a reference image and a second conversion image being a comparison image, of a plurality of conversion images generated by the conversion;
calculating correction amounts for the first conversion data related to generation of the second conversion image for each coordinate value of the second conversion image, based on the detected amount of misalignment;
detecting a subject area in which a subject exists from the second conversion image;
correcting the first conversion data related to generation of the second conversion image, using one of the calculated correction amounts of a subject area in which a dynamic subject exists;
performing rotational coordinate transformation on the corrected first conversion data, to generate second conversion data for image combination defining conversion of the plurality of captured images;
converting the plurality of captured images input by frames into images in the coordinate system different from the coordinate system for the captured images, based on the second conversion data, and generate a plurality of images for combination; and
combining the plurality of images for combination for each frame, and generate a composite image expressed in the coordinate system different from the coordinate system for the captured images.

8. A non-transitory computer-readable non-transitory recording medium storing a program for causing a computer to execute a method, the method comprising:
converting a plurality of captured images in which image capturing ranges partially overlap into images in a coordinate system different from a coordinate system for the captured images, based on a first conversion data;
detecting an amount of misalignment in an overlapping area in which the image capturing ranges overlap, between a first conversion image being a reference image and a second conversion image being a comparison image, of a plurality of conversion images generated by the conversion;
calculating correction amounts for the first conversion data related to generation of the second conversion image for each coordinate value of the second conversion image, based on the detected amount of misalignment;
detecting a subject area in which a subject exists from the second conversion image;
correcting the first conversion data related to generation of the second conversion image, using one of the calculated correction amounts of a subject area in which a dynamic subject exists;
performing rotational coordinate transformation on the corrected first conversion data, to generate second conversion data for image combination defining conversion of the plurality of captured images;
converting the plurality of captured images input by frames into images in the coordinate system different from the coordinate system for the captured images, based on the second conversion data, and generate a plurality of images for combination; and
combining the plurality of images for combination for each frame, and generate a composite image expressed in the coordinate system different from the coordinate system for the captured images.

* * * * *